(12) United States Patent
Yang et al.

(10) Patent No.: US 9,007,757 B2
(45) Date of Patent: Apr. 14, 2015

(54) INFORMATION PROCESSING DEVICE

(75) Inventors: Zhifeng Yang, Beijing (CN); Huang Dai, Beijing (CN); Wenlin Hou, Beijing (CN); Daye Yang, Beijing (CN); Huabing Liu, Beijing (CN); Shenghua Xi, Beijing (CN); Weijie Cao, Beijing (CN)

(73) Assignees: Beijing Lenovo Software Ltd., Beijing (CN); Lenovo (Beijing) Co., Ltd., Beijing (CN)

( * ) Notice: Subject to any disclaimer, the term of this patent is extended or adjusted under 35 U.S.C. 154(b) by 193 days.

(21) Appl. No.: 13/637,829

(22) PCT Filed: Mar. 28, 2011

(86) PCT No.: PCT/CN2011/072220
§ 371 (c)(1),
(2), (4) Date: Sep. 27, 2012

(87) PCT Pub. No.: WO2011/120413
PCT Pub. Date: Oct. 6, 2011

(65) Prior Publication Data
US 2013/0021738 A1    Jan. 24, 2013

(30) Foreign Application Priority Data

Mar. 30, 2010 (CN) ................ 2010 2 0146649 U
May 18, 2010 (CN) .................... 2010 1 0177405
Sep. 29, 2010 (CN) .................... 2010 1 0500364
Sep. 30, 2010 (CN) .................... 2010 1 0502345

(51) Int. Cl.
H05K 5/00    (2006.01)
G06F 1/16    (2006.01)

(52) U.S. Cl.
CPC ............ *G06F 1/1616* (2013.01); *G06F 1/1632* (2013.01)

(58) Field of Classification Search
USPC ....................................... 361/679.26
See application file for complete search history.

(56) References Cited

U.S. PATENT DOCUMENTS

| | | |
|---|---|---|
| 5,822,183 A | 10/1998 | Kanda et al. |
| 6,243,261 B1 | 6/2001 | Janik et al. |
| 6,493,033 B1 | 12/2002 | Glogan et al. |
| 7,083,446 B2 | 8/2006 | Tanaka et al. |

(Continued)

FOREIGN PATENT DOCUMENTS

| | | |
|---|---|---|
| CN | 2377614 | 5/2000 |
| CN | 2396424 | 9/2000 |

(Continued)

OTHER PUBLICATIONS

PCT/CN2011/072220 International Preliminary Report on Patentability dated Oct. 2, 2012 (13 pages).

(Continued)

*Primary Examiner* — Forrest M Phillips
(74) *Attorney, Agent, or Firm* — Brinks Gilson & Lione; G. Peter Nichols

(57) ABSTRACT

An information processing device that includes a first housing for accommodating a calculating means; a second housing for accommodating a display means; a third housing for accommodating an input means and a power supply means; a first connection means for connecting the first housing with the third housing; and a second connection means for connecting the second housing with the third housing.

34 Claims, 13 Drawing Sheets

(56) References Cited

U.S. PATENT DOCUMENTS

| | | | |
|---|---|---|---|
| 7,093,764 | B1 | 8/2006 | Valenzuela et al. |
| 7,762,827 | B2 | 7/2010 | Liu |
| D705,785 | S * | 5/2014 | Wang .......................... D14/447 |
| 8,714,351 | B2 * | 5/2014 | Toulotte ........................ 206/320 |
| 8,724,312 | B2 * | 5/2014 | Jones et al. ............. 361/679.44 |
| D706,761 | S * | 6/2014 | Lee et al. ...................... D14/315 |
| 8,749,963 | B2 * | 6/2014 | Staats et al. ............. 361/679.26 |
| 8,749,965 | B1 * | 6/2014 | Lam et al. ................ 361/679.27 |
| 8,749,969 | B2 * | 6/2014 | Yang et al. .............. 361/679.55 |
| 2005/0237398 | A1 | 10/2005 | Fujii et al. |
| 2006/0205258 | A1 | 9/2006 | Cho et al. |
| 2010/0014239 | A1 * | 1/2010 | Sassounian ............. 361/679.26 |
| 2010/0112838 | A1 | 5/2010 | Liu |
| 2010/0290179 | A1 * | 11/2010 | Hsu ........................ 361/679.26 |
| 2011/0080702 | A1 * | 4/2011 | Ladouceur et al. ...... 361/679.09 |
| 2011/0249389 | A1 * | 10/2011 | Goto ....................... 361/679.26 |

FOREIGN PATENT DOCUMENTS

| | | |
|---|---|---|
| CN | 1296581 A | 5/2001 |
| CN | 2472269 | 1/2002 |
| CN | 2530080 Y | 1/2003 |
| CN | 2567653 Y | 8/2003 |
| CN | 2609043 | 3/2004 |
| CN | 2674525 Y | 1/2005 |
| CN | 1610355 | 4/2005 |
| CN | 1692531 A | 11/2005 |
| CN | 1729683 A | 2/2006 |
| CN | 1952861 | 4/2007 |
| CN | 101150938 | 3/2008 |
| CN | 201063125 | 5/2008 |
| CN | 101426165 A | 5/2009 |
| CN | 101483795 | 7/2009 |
| CN | 101728707 | 6/2010 |
| CN | 201754615 U | 3/2011 |
| CN | 201780526 | 3/2011 |
| JP | 2004-127996 | 4/2004 |
| JP | 2004-297421 | 5/2008 |

OTHER PUBLICATIONS

PCT/CN2011/072220 International Search Report dated Jul. 14, 2011 (5 pages).

First Office Action dated Mar. 1, 2013 in corresponding Chinese Application No. 201010500364.8 filed on Sep. 29, 2010 (19 pages including English translation).

Second Office Action dated Aug. 6, 2013 in corresponding Chinese Application No. 201010500364.8 filed on Sep. 29, 2010 (18 pages including English translation).

First Office Action dated Jun. 20, 2013 in corresponding Chinese Application No. 201010502345.9 filed on Sep. 30, 2010 (14 pages including English translation).

Second Office Action dated Feb. 18, 2014 in corresponding Chinese Application No. 201010502345.9 filed on Sep. 30, 2010 (4 pages including English translation).

\* cited by examiner

INFORMATION PROCESSING DEVICE

TECHNICAL FIELD

The present invention relates to an information processing device. More particularly, the invention relates to a layout design of the information processing device.

BACKGROUND

With increasing prevalence of electronic devices such as notebook computers, there are more requirements on fashion design for notebook computer products. Recently, a trend for notebook computer development is to make notebook computers as thin as possible. Many manufacturers constantly release thin notebook computer products. However, these notebook computer products generally comply with the traditional layout designs.

For example, a notebook computer of Apple® corporation uses a measure to modify the appearance of the notebook, to make the notebook computer to be very thin in a visual view, but the actual thickness of the notebook computer is 4 mm~19.4 mm, so its average thickness is still relatively high.

Although many designs for thin notebook computers have been proposed, there are following problems in the thin layout design of these notebook computers.

For example, since the thickness of the notebook computer is very low, which causes bad heat dissipation, thus some part on some notebook computers' housing (for example, the periphery of a keyboard) has a very high temperature, so the user experience is very bad.

In addition, since many notebook computer products decrease their thickness at the price of low keyboard stroke or low screen opening angle, the human-machine interaction between the user and the computer becomes worse. Meanwhile, since the thin design of the notebook computer causes increased complexity of the structure of respective means inside the notebook computer, its manufacture cost is increased and the difficulty for maintenance is increased.

In addition, to save space, normally, the size of a battery of a thin notebook computer is relatively small, which causes the battery's capacity smaller and reduces the life of the battery. In addition, since many thin notebook computers have larger size in order to reduce their thickness, they are not easy to be carried.

SUMMARY

Thus, in order to solve the above problems, according to one aspect of an embodiment of the invention, an information processing device is provided, comprising: a first housing for accommodating a calculating means; a second housing for accommodating a display means; a third housing for accommodating an input means and a power supply means; a first connection means for connecting said first housing with said third housing; and a second connection means for connecting said second housing with said third housing.

In addition, according to another aspect of an embodiment of the invention, the first housing is a first space enclosed by at least six end faces, said second housing has a second space enclosed by at least six end faces, and said third housing has a third space enclosed by at least six end faces. The front end face of said first housing is connected with the back end face of said third housing through said first connection means, and the back end face of said second housing is connected with the back end face of said third housing through said second connection means.

In addition, according to another aspect of an embodiment of the invention, the first end of the first connection means is connected with the front end face of the first housing in a plug-pull manner, and/or the second end of the first connection means is connected with the back end face of the third housing in a plug-pull manner.

In addition, according to another aspect of an embodiment of the invention, the first connection means includes a rotating shaft, and the front end face of said first housing is connected with the back end face of said third housing through the rotating shaft.

In addition, according to another aspect of an embodiment of the invention, the angle between said first housing and said third housing is 0° to 180°.

In addition, according to another aspect of an embodiment of the invention, the information processing device further includes a self-locking means, configured to fix the position of the first housing relative to the third housing.

In addition, according to another aspect of an embodiment of the invention, when the self-locking means fixes the position of the first housing relative to the third housing, said angle between the first housing and the third housing is 135°.

In addition, according to another aspect of an embodiment of the invention, said calculating means includes a mainboard component, a processor component, a heat dissipator component, a display output component, and a storage component.

In addition, according to another aspect of an embodiment of the invention, the power supply means supplies power to the calculating means and the display means.

In addition, according to another aspect of an embodiment of the invention, the thickness of the first housing is less than or equal to a sum of the thicknesses of the second housing and the third housing.

In addition, according to an aspect of an embodiment of the invention, an information processing device is provided, comprising: a first housing for accommodating a calculating means; a second housing for accommodating a display means; a third housing for accommodating an input means and a power supply means; a first connection means, for connecting said first housing with said third housing; and a second connection means, for connecting said first housing with said second housing.

In addition, according to an aspect of an embodiment of the invention, an information processing device is provided, comprising: a first housing for accommodating a calculating means; a second housing for accommodating a display means; a third housing for accommodating an input means and a power supply means; a first connection means, for connecting to said first housing, said second housing and said third housing, respectively.

According to the embodiment of the invention, by separating the calculating means including for example, a mainboard component, a processor component, a heat dissipator component, a display output component, and a storage component, from the input means and the power supply means, and arranging the first housing accommodating the calculating means on the back end face of the third housing accommodating the input means and the power supply means, the thickness of the third housing including the input means and the power supply means can be significantly reduced, so that the overall thickness of the information processing device can be significantly reduced.

In addition, since the calculating means is integrated within the first housing, the structure of the information processing device of the embodiment of the invention is greatly simplified, the cost for manufacture and maintenance is correspondingly reduced, meanwhile system modularization design can be applied to the first housing, so that the information processing device has a rich scalability and reduces the complexity of the supplying chain.

In addition, since the first housing accommodating the calculating means is separated from the third housing accommodating the input means and the power supply means, the information processing device of the embodiment of the invention has a good heat dissipation performance, and the user experience can be improved. Meanwhile, since the space of the third housing for accommodating the input means and the power supply means is large enough, a standard-sized battery can be used to provide longer duration time and longer lifetime.

DETAILED DESCRIPTION

Figure 1:
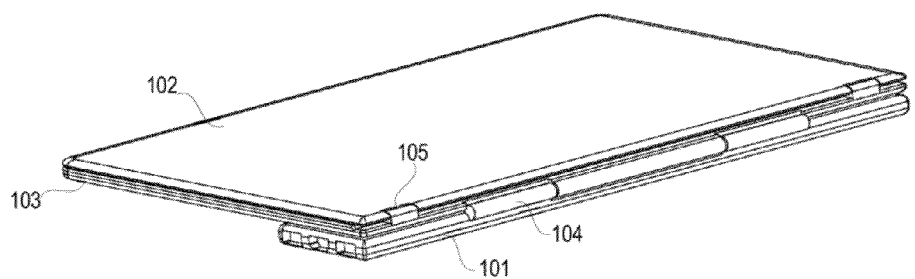
FIG. 1 is a schematic diagram showing a layout of an information processing device according to a first embodiment of the invention.

Illustrative embodiments of the invention will be described in detail with reference to the drawings. Here, to be noted that in the drawings, the same reference numbers are given to the components with substantively same functions, and to simplify the specification, a redundant description about the substantively same component will be omitted.

FIG. 1 is a schematic diagram showing a layout of an information processing device according to a first illustrative embodiment of the invention.

As shown in FIG. 1, an information processing device 100 such as a notebook includes a first housing 101, a second housing 102, a third housing 103, a first connection means 104 and a second connection means 105. For example, the first housing 101 may accommodate calculating means, the second housing 102 may accommodate display means, and the third housing 103 may accommodate input means and power supply means. In addition, the first connection means 104 may connect the first housing 101 with the third connection means 103, and the second connection means 105 may connect the second housing 102 with the third housing 103.

According a first illustrative embodiment of the invention, the first housing 101 may have a cube space enclosed by at least six end faces (housing surfaces), and a calculating means of the information processing device is accommodated within the space. For example, according to the first embodiment of the invention, the calculating means is a component for controlling respective components of the information processing device and generating data needed by the respective components based on various programs stored therein, and (for example) includes hardware components such as a mainboard component, a processor component, a heat dissipator component, a display output component, and a storage component (which will be described below). Here, to be noted that the hardwares such as a mainboard component, a processor component, a heat dissipator component, a display output component, and a storage component are not limited to specific types, and any hardware component or their combination capable for executing predetermined operations based on program data and user data can be utilized.

Similar to the first housing 101, the second housing 102 may have a cube space enclosed by at least six end faces (housing surfaces), and a display means such as a display is accommodated within the space. The display means displays an image thereon based on image data from the calculating means. The display means according to the first illustrative embodiment of the invention may include any kind of flat-panel display. The screen of the display means is partially exposed at least on at least one end face of the at least six end faces of the second housing 102.

Similar to the first housing 101, the third housing 103 may have a cube space enclosed by at least six end faces (housing surfaces), and an input means such as a keyboard and a touch panel and a power supply means such as a rechargeable battery are accommodated within the space. Here, the input means such as a keyboard and a touch panel may receive an instruction input from a user, and transmit the received input instruction to the calculating means, and the power supply means may supply power to the calculating means and the display means. Keys provided by the keyboard for user input are partially exposed at least on at least one end face of the at least six end faces of the third housing 103; a panel provided by the touch panel for user touch is partially exposed at least on the at least one end face of the at least six end faces of the third housing 103. Illustratively, the end face on the third housing 103 partially exposing the keys of the keyboard and the end face of the third housing 103 partially exposing the touch panel of the touch panel are the same one end face. In another aspect, except for the exposed part, the remaining parts of the keyboard and the touch panel are located within the third housing 103, and are arranged in a tiled manner with a rechargeable battery (as power supply means), that is, the position of the rechargeable battery within the third housing 103 is not overlapped with the hidden part of the keyboard and the hidden part of the touch panel, and in other words, the rechargeable battery is not arranged at the position of the keyboard and the touch panel within the third housing, so as to reduce the thickness of the third housing. As shown in FIG. 1, the first connection means 104 may be connected with a front end face of the first housing 101 and a back end face of the third housing 103 respectively. In the embodiment, the first connection means 104 may include a rotatable shaft structure such as a hinge. Normally, for example, the first connection means 104 may be composed of a core shaft and a shaft sleeve, and the shaft sleeve is rotatable with respect to the core shaft. Normally, the shaft sleeves are a pair, i.e., a first shaft sleeve and a second shaft sleeve, a first connection component is set on the first shaft sleeve to be fixedly connected to the first housing 101, and the second connection component is set on the second shaft sleeve to be fixedly connected to the third housing 103. For example, the core shaft in the first connection means 104 is fixed on the third housing 103, and the shaft sleeve of the first connection means 104 is fixed on the first housing 101. According to the above configuration, by the first connection means 104 including the rotatable shaft structure, the first housing 101 for accommodating the calculating means may be connected with the third housing 103 for accommodating the input means and the power supply means, and the first housing 101 is rotatable with respect to the third housing 103 through the first connection means 104. For example, the rotation angle between the first housing 101 with respect to the third housing 103 may be between 0° and 180°. In addition, any rotatable shaft structure can be utilized to realize the connection between the first housing 101 and the third housing 103, and these rotatable shaft structures are known to the person skilled in the art.

In addition, the core shaft in the first connection means 104 may be hollow in the middle, and thus, wires, pins or FPC (flexible printed circuit) may be arranged in the first connection means 104 to electrically connect the calculating means in the first housing 101 with the input means and the power supply means in the third housing 103, so that the calculating means can receive the input from the input means, and the power supply means can also supply power to the calculating means. Here, since the above electrical connection manner is known to the person skilled in the art, and may be arbitrarily set based on specific interfaces, specifications or types, a detailed description about the electrical connection between the calculating means and the input means as well as the power supply means is omitted here.

Similarly, the second connection means 105 may be connected with a back end face of the second housing 102 and a back end face of the third housing 103 respectively. In the embodiment, the second connection means 105 may include a rotatable shaft structure. By the second connection means 105, the second housing 102 for accommodating the display means may be connected with the third housing 103, and the second housing 102 is rotatable with respect to the third housing 103 through the second connection means 105. In addition, wires or FPC may be arranged in the second connection means 105 to electrically connect the display means in the second housing 102 with the power supply means in the third housing 103 and the calculating means and so on in the first housing 101 through the first connection means 104. Illustratively, when the rotation angle between the second housing 102 and the third housing 103 through the second connection means 105 is 0°, the end face on the second housing 102 partially exposing screen and the end face on the third housing 103 partially exposing keys and touch panel are opposite.

Next, a layout of the calculating means within the first housing 101 will be described briefly.

Figure 2:
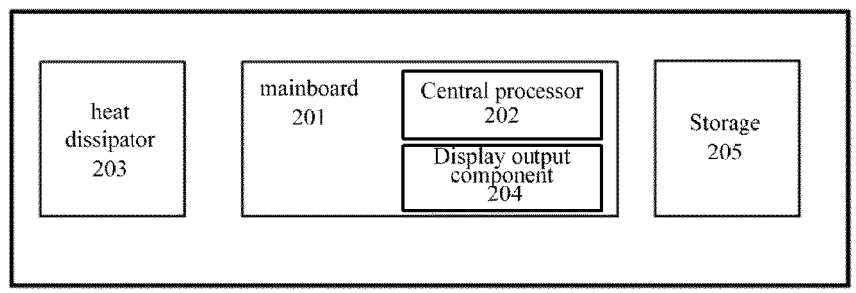
FIG. 2 is a schematic diagram of a layout within the first housing of the information processing device as shown in FIG. 1.

FIG. 2 is a schematic diagram of the layout within the first housing 101 of the information processing device 100 as shown in FIG. 1.

As shown in FIG. 2, in the first housing 101, the calculating means includes hardware devices such as a mainboard 201, a central processor 202, a heat dissipator 203, a display output component 204 and a storage 205. For example, according to the first embodiment of the invention, in the space formed by the first housing 101, the heat dissipator 210 such as a fan, a heat dissipation plate and so on may be arranged on the left. The mainboard 201 may be arranged on the middle part of the space, and hardware devices of the central processor 202, the display output component 204 such as a graphics card and an RAM (not shown) may be arranged on the mainboard 201. Here, a storage such as SSD (Static State Disk) or flash memory is arranged on the right part of the space to store program data or user data. Here, to be noted that since the connection relationship between respective components of the calculating means is known to the person skilled in the art, a detailed description about the connection and the interaction between the respective components is omitted here.

As above, the calculating means of the information processing device 100 forms the system part of the information processing device. That is, in addition to the power supply means of the information processing device 100, the input means such as a keyboard or a touch panel and the display means, other functional means of the information processing device 100 can be substantially arranged within the first housing 101. In addition, since the power supply means and the input means, which occupy a larger space, are arranged within the third housing 103, the space occupied by the first housing 101 accommodating the calculating means is smaller. The layout of the respective hardware devices (for example, the positions of the respective functional modules) within the first housing 101 can be properly arranged, so that the thickness of the first housing 101 is less than or equal to the sum of the thicknesses of the second housing 102 and the third housing 103.

According to the above configuration, since the calculating means is separated from the input means such as the keyboard or the touch panel and the power supply means, the thickness of the third housing 103 accommodating the input means and the power supply means can be significantly reduced, so that the overall thickness of the information processing device 100 can be significantly reduced. For example, based on the layout design of the information processing device 100 of the first embodiment of the invention, in the case of using a super-thin flat panel display means, the overall thickness of the information processing device 100 (i.e., the overall thickness of the second housing and the third housing) can be easily reduced to 9 mm or below. According to the above configuration, since means with great heat generation (such as a central processor, a display output component and so on) are integrated within the first housing 101 at the back of the information processing device 100, when a user is using the information processing device 100, it is difficult for the heat to propagate into the third housing 103 including the input means and the power supply means, the user will not feel uncomfortable in use, so that the comfortability of the user is improved.

In addition, since the calculating means including most functional means is integrated within the first housing 101, the structure of the information processing device according to the embodiment of the invention can be significantly simplified, while the cost for manufacture and maintenance is correspondingly reduced. As above, since the calculating means can be integrated within the first housing 101, a system modulization design can be applied to the first housing, that is, a calculating means with a different performance can be arranged within the first housing 101 according to different requirements, and the first housing 101 is connected with the third housing 103 through the first connection means 104, so that the information processing device 100 has a large scalability.

In addition, since the space of the third housing 103 for accommodating the input means and the power supply means is large enough, a standard-size rechargeable battery or a larger rechargeable battery can be used to provide longer duration time and longer lifetime. In another aspect, except for the exposed part, the remaining parts of the keyboard and the touch panel are located within the third housing 103, and are arranged in a tiled manner with a rechargeable battery as the power supply means (that is, the position of the rechargeable battery within the third housing 103 is not overlapped with the hidden part of the keyboard and the hidden part of the touch panel, and in other words, the rechargeable battery is not arranged at the position of the keyboard and the touch panel within the third housing), so as to reduce the thickness of the third housing. Meanwhile, since the space of the third housing 103 is relatively large, and the keyboard is arranged in a tiled manner with the rechargeable battery, the information processing device 100 according to the embodiment of the invention can use a keyboard with a standard keyboard stroke (for example, 4.7 mm) as the input means, so as to improve the user's comfortability and experience. Next, different placing states of the information processing device 100 according to an embodiment of the invention will be described.

FIG. 3 is a schematic diagram of different placing states of the information processing device as shown in FIG. 1.

Figure 3A:
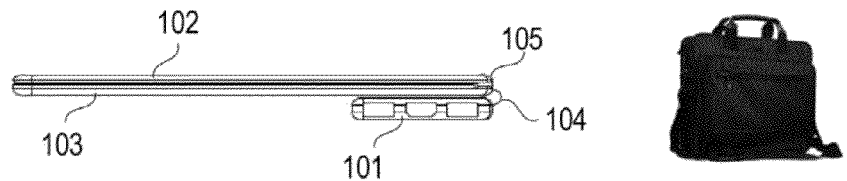
FIG. 3A and FIG. 3B are schematic diagrams of different placing states of the information processing device as shown in FIG. 1.

For example, as shown in FIG. 3A, when the information processing device 100 is not used, the first housing 101 and the third housing 103 are folded together (in which the relative angle between the both is 0 degree) for carrying, by rotating the first connection means 104 with respect to the third housing 103. Here, for example, the third housing 103 can be made of metal material, and a magnetic iron structure can be arranged within the first housing 101, so that when the first housing 101 and the third housing 103 are folded, the first housing 101 can be fixed on the bottom end face of the third housing 103, so as to improve the portability of the information processing device 100. Here, it is to be noted that the invention is obviously not limited to this, but a clamping structure can be configured on the first connection means 101, so that when the first housing 101 and the third housing 103 are folded, the first housing 101 can be fixed, so as to be fixed on the bottom end face of the third housing 103.

Figure 3B:
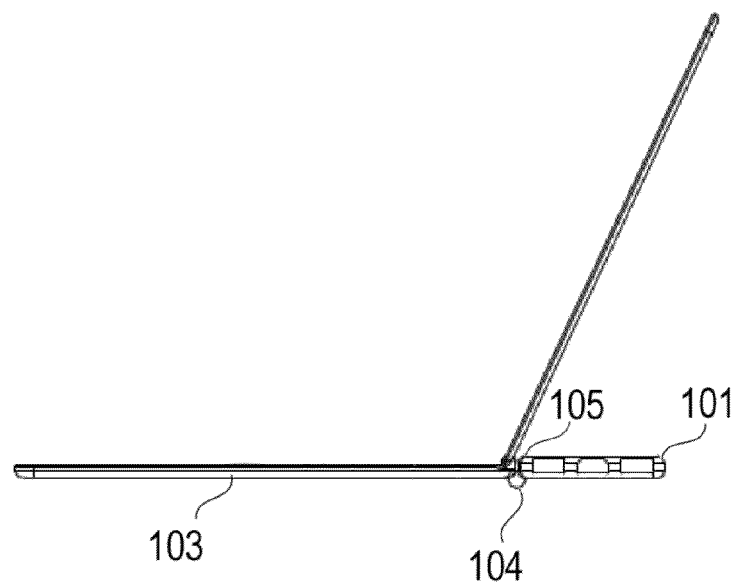

When the information processing device 100 is used, as shown in FIG. 3B, the first housing 101 can be separated from the bottom end face of the third housing 103, and the angle between the first housing 101 and the third housing 103 is 180 degree. In this case, a rubber pad (not shown) can be arranged on the end face of the first housing 101 to protect the first housing 101. With the above arrangement, since the first housing 101 for accommodating the calculating means as the major heating source is separated from the third housing 103 for accommodating the input means and the power supply means, it is difficult for the heat generated by the calculating means to reach the third housing 103 including the input means such as the keyboard. Thus, the user when using the information processing device 100 according to the invention will not feel uncomfortable due to the overheating of the housing, so as to improve the usage experience for the user.

In addition, according to a second embodiment of the invention, the information processing device 100 may further include a self-locking means for fixing the angle between the first housing 101 and the third housing 103 to a specific angle.

The structure of the self-locking means in the first connection means 104 of the information processing device 100 according to the second embodiment of the invention will be briefly described.

Figure 4A:
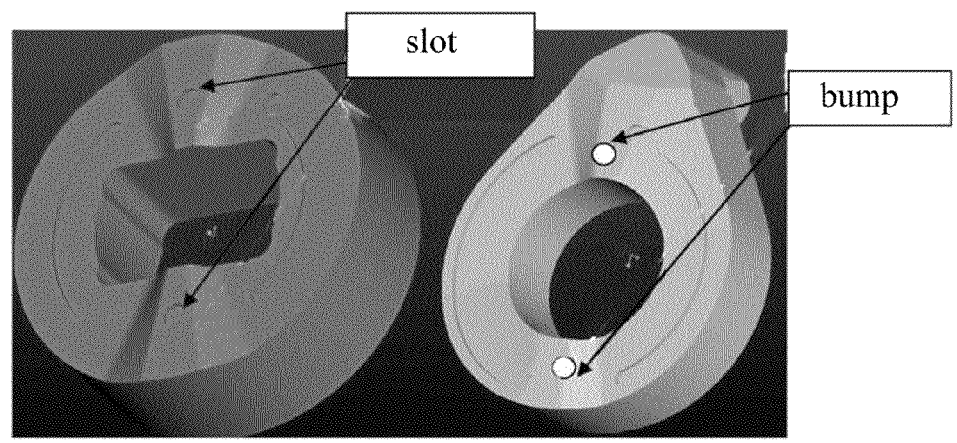
FIG. 4A and FIG. 4B are schematic diagrams showing a self-locking means in a first connection means of an information processing device according to a second embodiment of the invention.
Figure 4B:
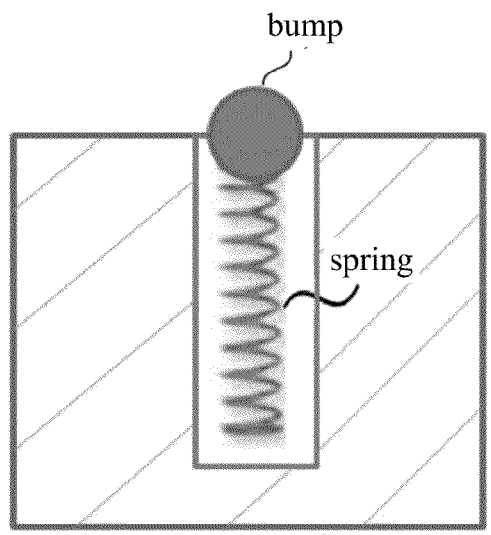

FIG. 4A and FIG. 4B are schematic diagrams showing a self-locking means in a first connection means 104 according to an embodiment of the invention.

For example, this self-locking means can be arranged (for example, fixed) in the first connection means 104 (such as, a core shaft and a shaft sleeve), and as shown in FIG. 4A, they can be composed of two coupled rotatable plates, two slots are arranged on one of the rotatable plates, bumps are arranged on another one of the rotatable plates. In particular, as shown in FIG. 4B, a spring is arranged under the bumps arranged on the other rotatable plate, so that the bumps are projected out of the surface of this rotatable plate by the elasticity of the spring.

When a rotatable plate rotates relative to another rotatable plate, the bumps are pressed down by the opposite plate, which causes the spring to be compressed, so that the bumps can be hidden within the space provided when the spring is compressed. The positions of the bumps and the slots on the rotatable plates can be configured, so that when the rotatable plates rotate so as to cause the angle between the first housing 101 and the third housing 103 to be (for example) 135°, the bumps and the slots will be aligned. At this time, since the spring's elasticity causes the bumps to go up so as to be clamped with the slots, the relative rotation of the two rotatable plates is limited to limit the relative rotation of the core shaft and the shaft sleeve in the first connection means 104. In this case, the first connection means 104 is fixed so as to fix the relative position of the first housing 101 relative to the third housing 103.

Figure 5:
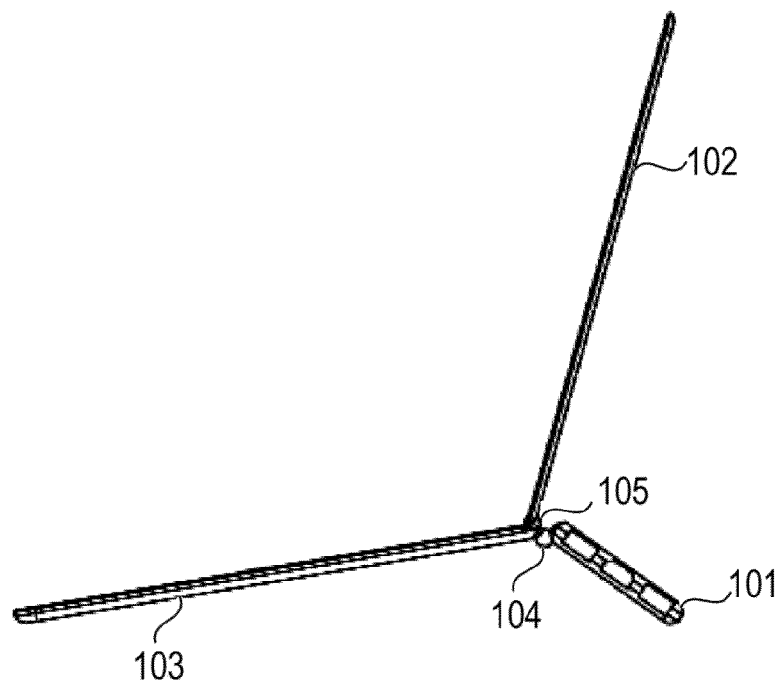
FIG. 5 is a schematic diagram of a state when the self-locking means fixes the first housing and the third housing of the information processing device.

When the first connection means 104 is fixed in the case that the angle between the first housing 101 and the third housing 103 is (for example) 135°, as shown in FIG. 5, the screen of the information processing device 100 is lifted up, so that a user can see the picture displayed thereon without bowing his/her head which significantly improves the usage comfortability of the user.

Herein, it is to be noted that the invention is not limited to the self-locking means as shown in FIG. 4, any self-locking means can be used to realize the self-locking means. In addition to the self-locking means, the damping coefficient of the core shaft and the shaft sleeve in the first connection means 104 can be increased so as to fix the relative position of the first housing 101 and the third housing 103. In this case, the damping coefficient (such as the roughness on the contact surface) at a particular position of the core shaft and the shaft sleeve in the first connection means 104 can be increased so as to fix the first connection means 104 when the relative angle between the first housing 101 and the third housing 103 reaches 135°. In addition, a self-locking means such as a clamp spring arranged on the first housing 101 or the third housing 103, can be arranged outside the first connection means 104 of the information processing device 10. Here, it is to be noted that the structure of the self-locking means according to the embodiment of the invention is not limited to the above structure, any structure for fixing the relative position of the first housing 101 relative to the third housing 103 can be utilized as the self-locking means according to the embodiment of the invention.

Here, it is to be noted that as long as the screen of the information processing device 100 can be lifted up to increase the usage comfortability of the user, the angle between the first housing 101 and the third housing 103 is not limited to 135°. In addition, the first housing 101 can be protected by the self-locking means fixing the first housing 101 when the angle between the first housing 101 and the third housing 103 is 180°.

Next, an information processing device according to a second embodiment of the invention will be described.

Figure 6A:
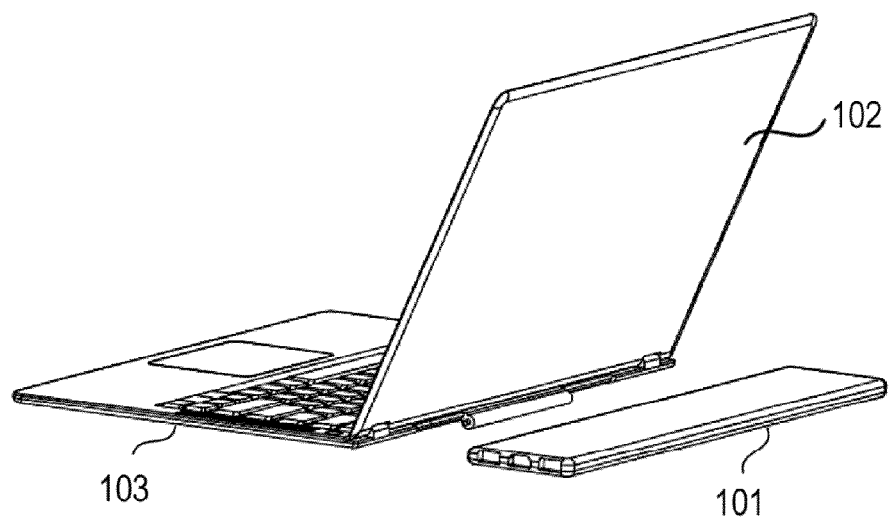
FIG. 6A and FIG. 6B are schematic diagrams of a layout of an information processing device according to another embodiment of the invention.
Figure 6B:
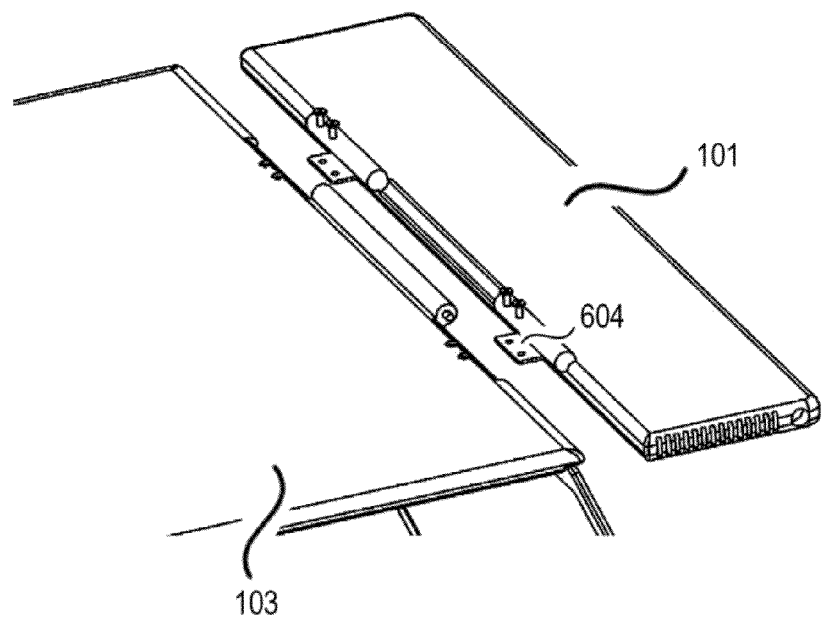

FIG. 6A and FIG. 6B are schematic diagrams for showing a layout of an information processing device 600 according to the second embodiment of the invention.

The difference between the information processing device 600 according to the second embodiment of the invention and the information processing device 100 as shown in FIG. 1 is that the first connection means 604 connects the first housing 101 with the third housing 103 in a plug-pull manner. Since other components of the information processing device 600 are same with or similar to the corresponding components of the information processing device 100, the same reference numbers can be used on them, and their detailed description is omitted.

For example, as shown in FIG. 6, the first connection means 604 can include a plug, and one end of the first connection means 604 is fixed on the front end face of the first housing 101. In addition, the first connection means 604 can further include a slot arranged on the third housing 103 to allow the plug of the first connection means 604 to be plugged into the slot, so that the first connection means 604 connects the front end face of the first housing 101 with the back end face of the third housing 103. Pins can be arranged in the plug, and corresponding pins can be arranged in the slot. According to the above arrangement, wires or FPC (Flexible Printed Circuit) can be arranged to electrically connect the calculating means in the first housing 101 to the input means and the power supply means in the third housing 103. Here, since the above electrical connection manner is known to the person skilled in the art, and can be arbitrarily arranged based on particular interfaces, specifications or types, the detailed description of the electrical connection between the calculating means and the input means as well as the power supply means is omitted herein.

Here, it is to be noted that, the first connection means 604 according to the embodiment of the invention is not limited to the plug and the slot as shown in FIG. 6. For example, the first connection means 604 can include a plug fixed on the back end face of the third housing 103, and meanwhile can include a slot arranged on the front end face of the first housing 101 to realize the connection between the first housing 101 and the third housing 103. In addition, for example, the first connection means 604 can further include a bidirectional plug and slots arranged on the front end face of the first housing 101 and the back end face of the third housing 103, so as to connect the front end face of the first housing 101 with the back end face of the third housing 103 through the first connection means 604.

In addition, since the calculating means including most functional means is integrated within the first housing 101, the structure of the information processing device according to the embodiment of the invention can be significantly simplified, while the cost for manufacture and maintenance is correspondingly reduced.

The image processing device 100 according to the embodiment of the invention is described above, but the invention is not limited to this.

For example, an information processing device according to a second embodiment of the invention is provided, including a first housing 101 for accommodating a calculating means, a second housing 102 for accommodating a display means, and a third housing 103 for accommodating an input means and a power supply means. In addition, the first connection means 104 may connect the first housing 101 with the third connection means 103, and the second connection means 105 may connect the first housing 101 with the second housing 102.

The difference from the above embodiment is that the second connection means 105 can further connect the first housing 101 for accommodating the calculating means with the second housing 102 for accommodating the display means. In particular, one of the first connection means 104 and the second connection means 105 is connecting housings on two ends of the connection means in a fixed manner, for example, connecting the first housing 101 with the second housing 102 through the second connection means in a fixed manner. Here, said fixed connection manner is the above one-end plugging manner or two-end plugging manner, or unplugged fixing manner (i.e., fixing by a bolt and so on), and the other one of the first connection means 104 and the second connection means 105 is connecting in a rotating manner, so the first housing 101 and the second housing 102 can be rotated as a whole with respect to the third housing 103. In this case, the power supply means and the input means in the third housing 103 can be electrically connected with the calculating means in the first housing 101 through the first connection means 104, and can be electrically connected with the display means and so on in the second housing through the first connection means 104 and the second connection means 105. Further, the second housing 102 can rotate with respect to the first housing 101 and the third housing 103 as a whole. Since the structure and the connection relationship of the other means in the embodiment are same with the embodiment as shown in FIG. 1, the detailed description of the structure and the connection relationship of the other means is omitted here.

The embodiment using the two connection means was described above. However, the invention is not limited to this, and according to an embodiment of the invention, only one connection means can be arranged to connect the first housing 101, the second housing 102 and the third housing 103 together. For example, the connection means can include a core shaft and two shaft sleeve sets. In this case, the core shaft of the connection means can be arranged on the third housing 103, and the two shaft sleeve sets are arranged on the core shaft in a stagger manner. In this case, one of the two shaft sleeve sets can be connected to the second housing 102, while the other of the two shaft sleeve sets is connected to the first housing 101. In addition, similar to the embodiment as shown in FIG. 1, the core shaft in the connection means may be hollow in the middle, and thus, wires, pins or FPC (flexible printed circuit) may be arranged in the first connection means 104 to electrically connect the calculating means in the first housing 101 with the input means and the power supply means in the third housing 103, and the display means in the second housing 102 can be electrically connected with the input means and the power supply means in the third housing 103.

With the above arrangement, since the first housing 101 for accommodating the calculating means as the major heating source is separated from the third housing 103 for accommodating the input means and the power supply means, it is difficult for the heat generated by the calculating means to reach the third housing 103 including the input means such as the keyboard. Thus, the user using the information processing device 100 according to the invention will not feel uncomfortable due to the overheating of the housing, so as to improve the usage experience for the user.

Further, with the development of the electronic device technology, more and more portable electronic devices need an auxiliary card arranged therein, for realizing a basic function of the electronic device or expanding auxiliary functions of the electronic device. For example, a notebook computer is configured with a 3G network card, a mobile phone is configured with a SIM card, and a digital camera or camcorder is configured with a storage card and so on.

Since the auxiliary card on the portable electronic device needs to be frequently detached from the electronic device to perform an replacement operation, how to design the installation structure of the auxiliary card on the electronic device so as to make the auxiliary card easy to be installed and detached to improve the usage comfortability for the user becomes a development and research point of the respective electronic device manufacturer.

In the prior art, a plug-in auxiliary card fixing structure is the most commonly used structure, which inserts the auxiliary card into the electronic device to be clamped and installed, and pushes the auxiliary card inward when detaching it, and pops up the auxiliary card by the elasticity structure on the electronic device. This kind of auxiliary card fixing structure does facilitate the user's usage, but for manufacturers, the electronic device's structure is complicated and has a relatively high manufacture cost, and since the means for clamping and poping out the auxiliary card is arranged within the electronic device, when there is a malfunction, it is difficult to repair it.

Thus, based on the above problems in the prior art, an object of the embodiment of the invention is to provide an information processing device, and the arranged auxiliary card fixing structure not only makes it easy to install and detach the auxiliary card, but also makes the structure simple which can save the manufacture cost.

To realize the above object, in the information processing device of the embodiment of the invention, said calculating means includes a mainboard;

said first housing includes a plurality of side faces, said plurality of side faces form an accommodating space of said first housing, said mainboard is arranged within said accommodating space, wherein, a open hole is arranged on a first side face of said plurality of side faces;

said information processing device further includes:

an auxiliary card fixing structure, for fixing an auxiliary card and eletrically connecting said auxiliary card with said mainboard;

a core shaft, fixedly arranged on one side of said hole;

a cover body, connected to said first housing through said core shaft, said cover body rotating outside said accommodating space with respect to said core shaft, for exposing said hole, so as to expose the auxiliary card fixing structure out, and for covering said hole to seal said auxiliary card fixing structure within said accommodating space.

In the above information processing device, said auxiliary card fixing structure is arranged on said mainboard and located at said hole, and on said mainboard, contacts for electrically connecting said auxiliary card with said mainboard is arranged at the arrangement position of said auxiliary card fixing structure.

In the above information processing device, said auxiliary card fixing structure is arranged on said cover body, and on said mainboard, contacts for electrically connecting said auxiliary card with said mainboard is arranged at the corresponding position of said auxiliary card fixing structure when said cover body is arranged to cover said hole.

In the above information processing device, said auxiliary card fixing structure is arranged on said cover body, and on said cover body, contacts for electrically connecting said auxiliary card with said mainboard is arranged at the arrangement position of said auxiliary card fixing structure.

In the above information processing device, said auxiliary card fixing structure includes a plugging-card space with a shape corresponding to said auxiliary card, and said auxiliary card is arranged and fixed within said plugging-card space in a tight match manner.

In the above information processing device, said information processing device further includes a card fixing structure for fixedly connecting said cover body with said first housing when said cover body is arranged to cover said hole.

In the above information processing device, said information processing device further includes an elastic support structure, connected with said first housing, said cover body and said core shaft, for providing said card fixing structure with a first elastic support force for tightening said cover body and said housing, and for providing said core shaft with a second elastic support force for rotating said cover body with respect to said housing.

In the above information processing device, said card fixing structure includes:

a bump, formed on a side of said cover body;

a slot, arranged on a corresponding position of said bump when said cover body is arranged to cover said hole, said bump being inserted into said slot to stick and fix said cover body.

In the information processing device, said elastic support structure includes:

a first pushing body, fixedly connected with said first housing;

a second pushing body, fixedly connected with said cover body;

a spring, sleeving said core shaft, located between said first pushing body and said second pushing body, wherein, a first end of said sprint extends to contact and connect to said cover body, a second end extends to contact and connect to said first housing, an elastic force of said spring pushing said second pushing body forms said first elastic support force, and a first pushing force of said first end pushing said cover body, a second pushing force of said second end pushing said first housing and an elastic twist force of said spring between said first end and said second end form said second elastic support force, for turning and opening said cover body with respect to said first housing.

In the above information processing device, said first side face is a bottom face of said first housing, and said cover body opening outwards with respect to said hole is further used to support said information processing device.

In addition, other than the first housing for accommodating the calculating means of the information processing device according to the embodiment of the invention, said auxiliary card fixing structure for fixing the auxiliary card can also similarly be applied to the second housing for accommodating the display means and the third housing for accommodating the input means and the power supply means.

In the above information processing device, said display means includes a mainboard;

said second housing includes a plurality of side faces, said plurality of side faces form an accommodating space of said second housing, said mainboard is arranged within said accommodating space, wherein, a hole is arranged on a first side face of said plurality of side faces;

said information processing device further includes:

an auxiliary card fixing structure, for fixing an auxiliary card and electrically connecting said auxiliary card to said mainboard;

a core shaft, fixedly arranged on one side of said hole;

a cover body, connected with said second housing through said core shaft, said cover body rotating outside said accommodating space with respect to said core shaft, for exposing said hole to expose said auxiliary card fixing structure out, and for covering said hole to seal said auxiliary card fixing structure within said accommodating space.

In the above information processing device, said input means and said power supply means include a mainboard;

said third housing includes a plurality of side faces, said plurality of side faces form an accommodating space of said third housing, said mainboard is arranged within said accommodating space, wherein a hole is arranged on a first side face of said plurality of side faces;

said information processing device further includes:

an auxiliary card fixing structure, for fixing an auxiliary card and electrically connecting said auxiliary card to said mainboard;

a core shaft, fixedly arranged on one side of said hole;

a cover body, connected with said second housing through said core shaft, said cover body rotating outside said accommodating space with respect to said core shaft, for exposing said hole to expose said auxiliary card fixing structure out, and for covering said hole to seal said auxiliary card fixing structure within said accommodating space.

The information processing device of the embodiment of the invention with the above structure has the following effects:

The auxiliary card fixing structure for fixing the auxiliary card is arranged under the cover body and located in an internal space at the hole on the cover body, and when the cover body rotates with respect to the side face, the auxiliary card fixing structure can be sealed or exposed, so not only the installation process and the detaching process for the auxiliary card are easy, but also the structure of the auxiliary card fixing structure arranged on the electronic device, the manufacture process and the maintenance process are also easy, and the object for saving the manufacture cost can be effectively achieved.

When the auxiliary card fixing structure and the contacts for electrically connecting the auxiliary card with the mainboard are all arranged on the cover body, the rotated and open cover body can be used to support the electronic device, so that the electronic device has an adjustable height.

The person skilled in the art can understand that although the above description is performed in the case that the auxiliary card fixing structure for fixing the auxiliary card according to the embodiment of the invention is used in the information processing device arranged with three housings, the auxiliary card fixing structure for fixing the auxiliary card according to the embodiment of the invention can be used alone, to be used in any information processing device with housings.

Below, with reference to a third embodiment through a fifth embodiment of the invention, a description will be performed on the case that the auxiliary card fixing structure for fixing the auxiliary card according to the embodiment of the invention is used for any information processing device with housings.

In the information processing device of the embodiment of the invention, a hole is arranged on one side face of the housing, and a cover body capable of rotating with respect to the side face is arranged at the hole, and the auxiliary card fixing structure for fixing the auxiliary card is arranged under the cover body and located in the internal space at the hole. When the cover body rotates with respect to the side face, the auxiliary card fixing structure can be sealed or exposed, so not only the installation process and the detaching process for the auxiliary card are easy, but also the structure of the auxiliary card fixing structure arranged on the electronic device, the manufacture process and the maintenance process are also easy, and the object for saving the manufacture cost can be effectively achieved.

The information processing device of the embodiment of the invention comprises:

a mainboard;

an auxiliary card fixing structure, for fixing an auxiliary card and electrically connecting said auxiliary card to said mainboard;

a housing, including a plurality of side faces, said plurality of side faces form an accommodating space of said housing, said mainboard is arranged within said accommodating space, wherein a hole is arranged on a first side face of said plurality of side faces;

a core shaft, fixedly arranged on one side of said hole;

a cover body, connected with said housing through said core shaft, said cover body rotating outside said accommodating space with respect to said core shaft, for exposing said hole to expose said auxiliary card fixing structure out, and for covering said hole to seal said auxiliary card fixing structure within said accommodating space.

Figure 7:
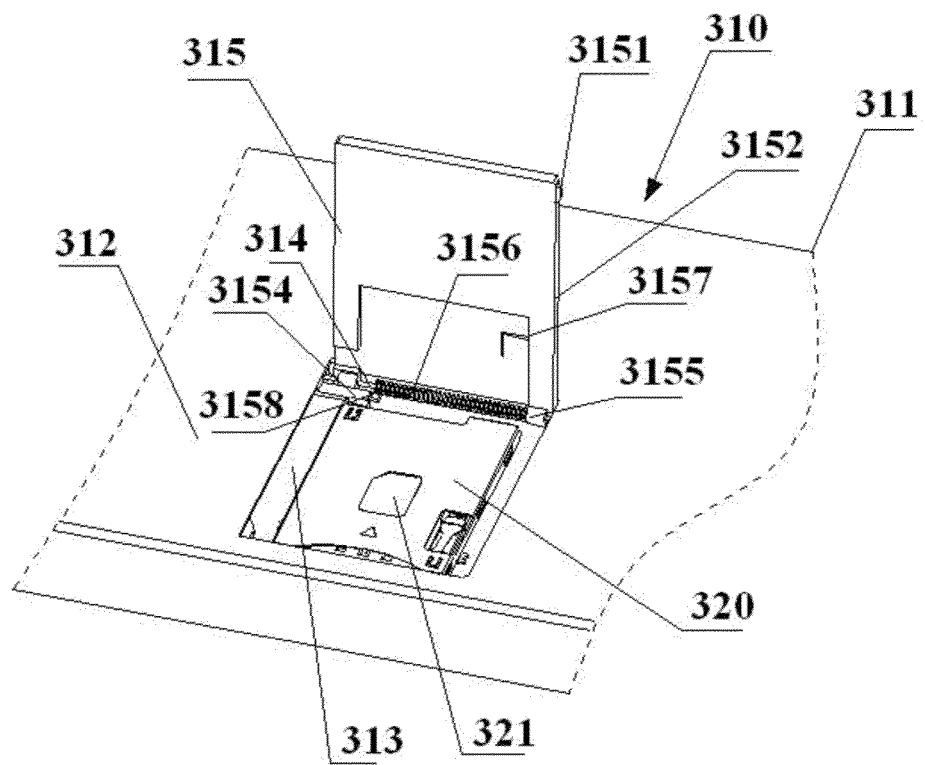
FIG. 7 is a schematic diagram for showing a auxiliary card fixing structure in an information processing device of a third embodiment of the invention.

FIG. 7 is a schematic diagram for showing said auxiliary card fixing structure in an information processing device of the third embodiment of the invention. With reference to FIG. 7, in the information processing device of the third embodiment, the information processing device 310 comprises:

a housing 311, including a plurality of side faces, which form an accommodating space of the housing, wherein electronic devices such as the mainboard, the memory and the graphics card and so on of the information processing device are arranged in the accommodating space. A hole 313 is arranged on the first side face 312 of the housing 311, to expose out a part of the electronic devices in the accommodating space.

Wherein, a core shaft 314 is arranged on one side of the hole 313, the cover body 315 arranged at the hole 313 is connected with the housing 311 through the core shaft 314, to rotate outside the housing 311 with respect to the core shaft 314, for covering the hole 313 so as to seal the auxiliary card fixing structure within the accommodating space of the housing 311, and for exposing the hole 313 so as to expose the auxiliary card fixing structure.

To ensure the integrity and the goodliness of the appearance of the electronic device, the cover body 315 has the shape and the size corresponding to the hole 313, and when the cover body 315 is covering the hole 313, the outer surface of the cover body 315 and the outer surface of the first side face 312 of the housing 311 are located in the same plane.

In the third embodiment of the invention, as shown in FIG. 7, a part of the mainboard of the information processing device is exposed through the hole 313, and the auxiliary card fixing structure 320 is arranged on the part of the mainboard exposed through the hole 313, the auxiliary card is fixed on the mainboard. On the mainboard, at the arrangement position of the auxiliary card fixing structure 320, the contacts for electrically connecting the auxiliary card with the mainboard are arranged, and when the auxiliary card is arranged on the auxiliary card fixing structure 320, the contacts of the auxiliary card are just connected with the contacts on the mainboard, so as to electrically connect the auxiliary card with the mainboard, to realize the function of the auxiliary card on the information processing device.

The auxiliary card fixing structure 320 uses the above arrangement manner, to expose the auxiliary card fixing structure 320 through the hole 320 using the cover body 315 capable of rotating and open, or to seal the auxiliary card fixing structure 320 in the accommodating space in the housing 311. When fetching and placing the auxiliary card, it only needs to open the cover body 315, which is simple and easy; in addition, when opening the cover body 315, the entire auxiliary card fixing structure 320 can be exposed out, and when the auxiliary card fixing structure 320 has malfunction, it is easy to repair it.

In the third embodiment of the invention, the particular structure of the auxiliary card fixing structure 320 may be the form as shown in FIG. 7, and the auxiliary card fixing structure 320 includes an inserted space corresponding to the auxiliary card, and the auxiliary card can be pushed to be inserted into the inserted space, to be fixed into the inserted space in a tight match manner. An opening 321 can be arranged on the auxiliary card fixing structure 320, to expose a part of the auxiliary card, and when it needs to remove the auxiliary card, the exposed part of the auxiliary card can be pressed to be pushed forwards, and then could be pulled out.

Figure 8:
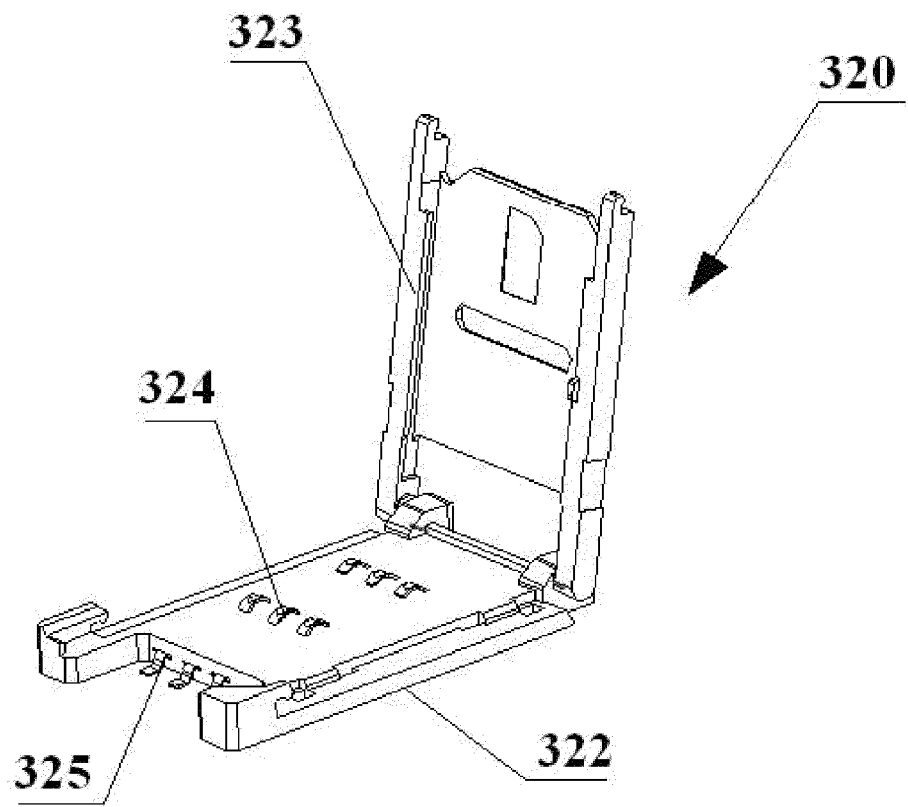
FIG. 8 is a schematic diagram for showing another direction of the auxiliary card fixing structure in the information processing device of the third embodiment of the invention.
Figure 9:
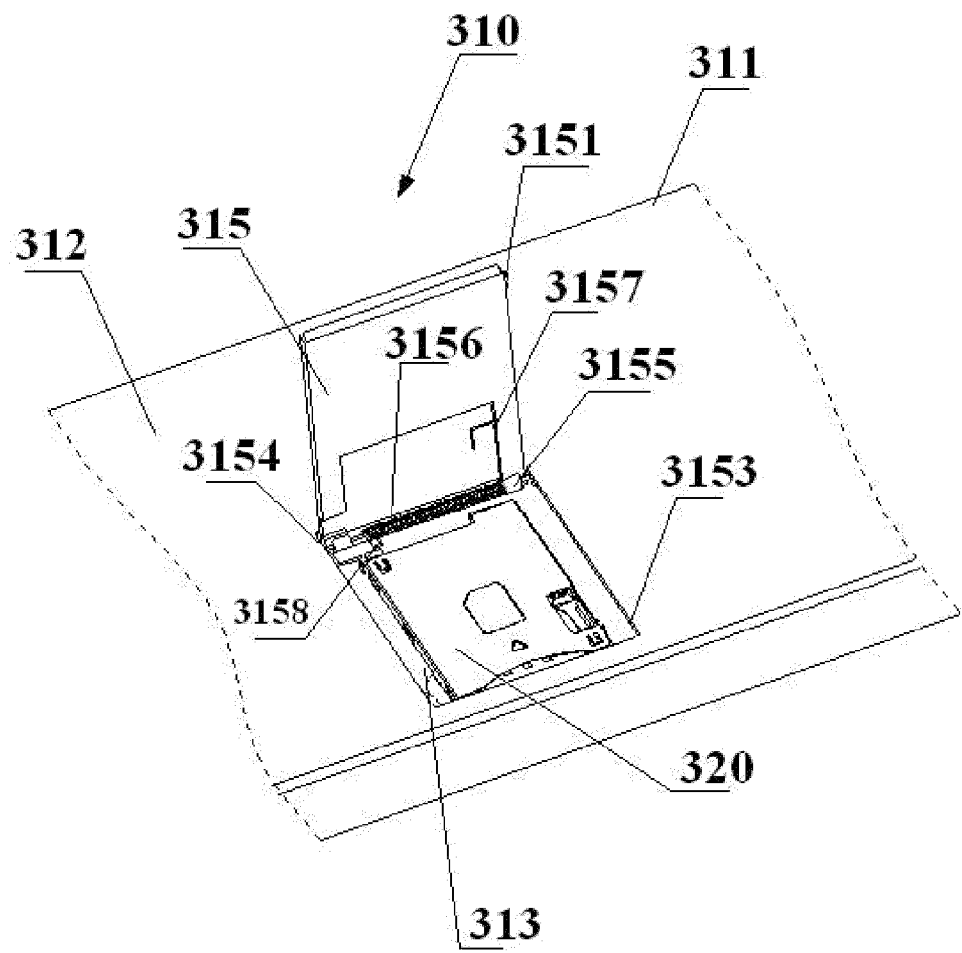
FIG. 9 is a schematic diagram for showing the specific structure of the auxiliary card fixing structure in the information processing device of the third embodiment of the invention.

In addition, the auxiliary card fixing structure 320 can be configured as a form to be rotated and open to expose the inserted space. A schematic diagram of another auxiliary card fixing structure 320 is as shown in FIG. 8. Wherein, the auxiliary card fixing structure 320 includes a bottom base 322 and a rotatable cover 323, and the rotatable cover 323 can rotate with respect to a fixed shaft of the bottom base 322, cover the bottom base 322 or open with respect to the bottom base 322. As shown in FIG. 8, the contacts 324 for electrically connecting the auxiliary card with the mainboard is arranged on the upper surface of the bottom base 322, when the rotatable cover 323 covers the bottom base 322, the rotatable cover 323 and the bottom base 322 leave an inserted space for placing the auxiliary card. The auxiliary card is clamped and fixed with the bottom base 322 through the rotatable cover 323, to be fixed within the inserted space.

It can be understood that the auxiliary card fixing structure 320 for installing the auxiliary card is not limited to the two forms listed above, and according to the prior art, the person skilled in the art can design the auxiliary card fixing structure 320 as multiple types of structures, which will not be listed one by one.

In the third embodiment of the invention, the information processing device further includes a card fixing structure and an elastic support structure, wherein the card fixing structure fixedly connects the cover body 315 with the housing 311 when the cover body 315 covers the hole 313. The elastic support structure is connected with the housing 311, the cover body 315 and the core shaft 314, for providing the card fixing structure with a first elastic support force for tightening said cover body 315 and said housing 311 and for providing the core shaft 314 with a second elastic support force for rotating said cover body 315 with respect to said housing 311.

With reference to FIG. 7, the card fixing structure of the third embodiment of the invention comprises:

a bump 3151, formed on a side 3152 of said cover body 315;

a slot, located on the first side face 312, that is the corresponding position 3153 of said bump 3151 when said cover body 315 is arranged to cover said hole 313, and the bump 3151 is inserted into said slot to stick and fix said cover body 315.

With reference to FIG. 7, the elastic support structure of the third embodiment of the invention comprises:

a first pushing body 3154 is fixedly connected with said housing 311, which is made together with the housing 311 in the particular embodiment of the invention;

a second pushing body 3155 is fixedly connected with said cover body 315, and the second pushing body 3155 and the bump 3151 are located on the same side of the cover body 315, for example, when the side 3152 where the bump 3151 is located is on the right side of the cover body 315, the second pushing body 3155 is arranged on the right side of the cover body 315; in the third embodiment of the invention, the second pushing body 3155 is formed as the shaft sleeve for sleeving the core shaft 314;

a spring 3156 sleeves the core shaft 314, and is located between the first pushing body 3154 and the second pushing body 3155, two ends of the spring 3156 are pushed and connected with the first pushing body 3154 and the second pushing body 3155, and the first end 3157 of the spring 3156 extends to be contacted and connected with the cover body 315, and the second end 3158 extends to be contacted and connected with the housing 311.

The spring 3156 is pressed to have a shape changing when it is arranged between the first pushing body 3154 and the second pushing body 3155, wherein the elastic force pushing on the second pushing body 3155 is used for providing the first elastic support force, i.e., pushing the cover body 315 to the right, to insert the bump 3151 into the slot on the first side face 312, and make it difficult to be taken off; in addition, since the first end 3157 is pushed and contacted with the cover body 315, and the second end 3158 is pushed and contacted with the housing 311, the direction of the first pushing force for the first end 3157 pushing the cover body 315 and the direction of the second pushing force for the second end 3158 pushing the housing 311 have an angle, so the first pushing force, the second pushing force and the elastic twist force between the first end 3157 and the second end 3158 make the cover body 315 have a relative rotating force with respect to the housing 311, for providing the second elastic support force, and when the cover body 315 is rotated and open with respect to the housing 311, for providing the cover body 315 with a drive force for automatically rotating.

With the above structure, a user can manually rotate the cover body 315, to make the downwards manual rotating force larger than the first pushing force of the first end 3157 pushing the cover body 315, the cover body 315 rotates downwards to cover the hole 313, and the bump 3151 is inserted in the slot on the first side face 312 to be fixed, and with the first elastic support force of the spring 3156, the bump 3151 could not be easily taken off from the slot so as to open the cover body 315. When the user attempts to open the cover body 315, he/she needs to press the cover body 315 to overcome the first elastic support force of the spring 3156, to shift the cover body 315 slightly to the left, the bump 3151 is taken off from the slot, and at this time, with the first pushing force, the second pushing force and the elastic twist force of the spring between the first end and the second end, the cover body 315 will be automatically rotated and open with respect to the housing 311.

Thus, with the above card fixing structure and the elastic support structure, the process for rotating, opening or closing the cover body 315 is simple and easy.

Figure 10:
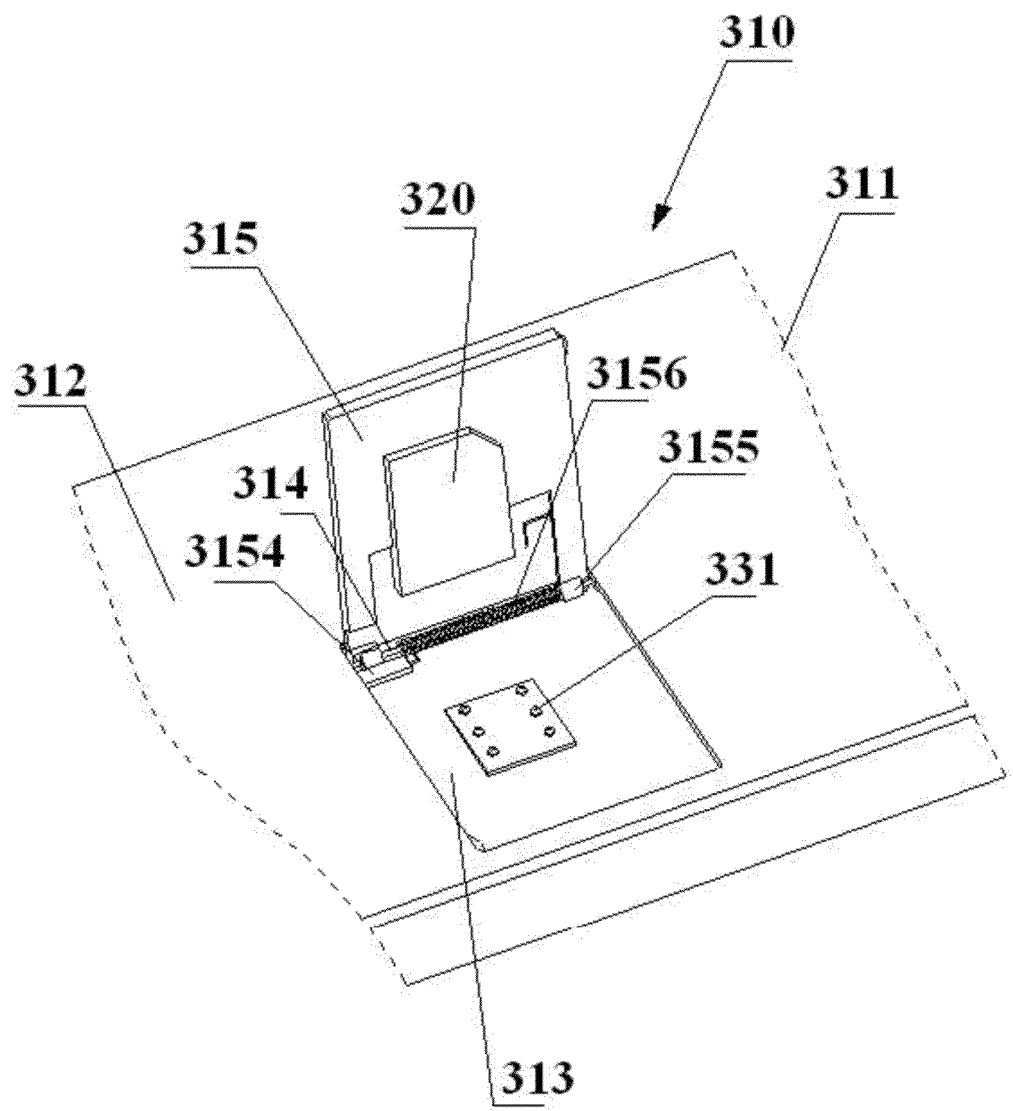
FIG. 10 is a schematic diagram for showing a auxiliary card fixing structure in an information processing device of a fourth embodiment of the invention.

In addition, the invention further provides an information processing device of the fourth embodiment, and FIG. 10 is a schematic diagram for showing said auxiliary card fixing structure in the information processing device of the fourth embodiment of the invention.

In the fourth embodiment, same with the third embodiment, a housing 311 is included, a hole 313 is arranged on the first side face 312 of the housing 311, a core shaft 314 is arranged on one side of the hole 313, the cover body 315 arranged at the hole 313 is connected with the housing 311 through the core shaft 314, to rotate outside the housing 311 with respect to the core shaft 314, for covering the hole 313 so as to seal the auxiliary card fixing structure within the accommodating space of the housing 311, and for exposing the hole 313 so as to expose the auxiliary card fixing structure.

The arrangement structure between the above housing 311 and the cover body 315 is the same with the third embodiment, which will not be described in detail.

Different from the third embodiment, the auxiliary card fixing structure 320 of the fourth embodiment is arranged on the cover body 315, and on the mainboard exposed through the hole 313, at the corresponding position of the auxiliary card fixing structure 320 when the cover body 315 covers the hole 313, contacts 331 for electrically connect the auxiliary card with the mainboard is arranged. As such, when the auxiliary card is placed on the auxiliary card fixing structure 320, the contacts on the auxiliary card is exposed outside the auxiliary card fixing structure 320, and is opposite to the contacts 331 on the mainboard, and when the cover body 315 covers the hole 313, the contacts of the auxiliary card are electrically connected with the contacts 331 of the mainboard, for realizing the functions of the auxiliary card through the information processing device.

The auxiliary card fixing structure 320 of the fourth embodiment includes an inserted space corresponding to the shape of the auxiliary card, and the auxiliary card is placed and fixed in the inserted space in a tight match manner.

As shown in FIG. 10, same with the third embodiment, in order to firmly bond the cover body 315 when it covers the hole, and in order to make the process for rotating and opening the cover body 315 easier, the information processing device further includes a card fixing structure and an elastic support structure, and the particular implementation and the action process of the card fixing structure and the elastic support structure can be the same as the above third embodiment, and will not be described again here.

Figure 11:
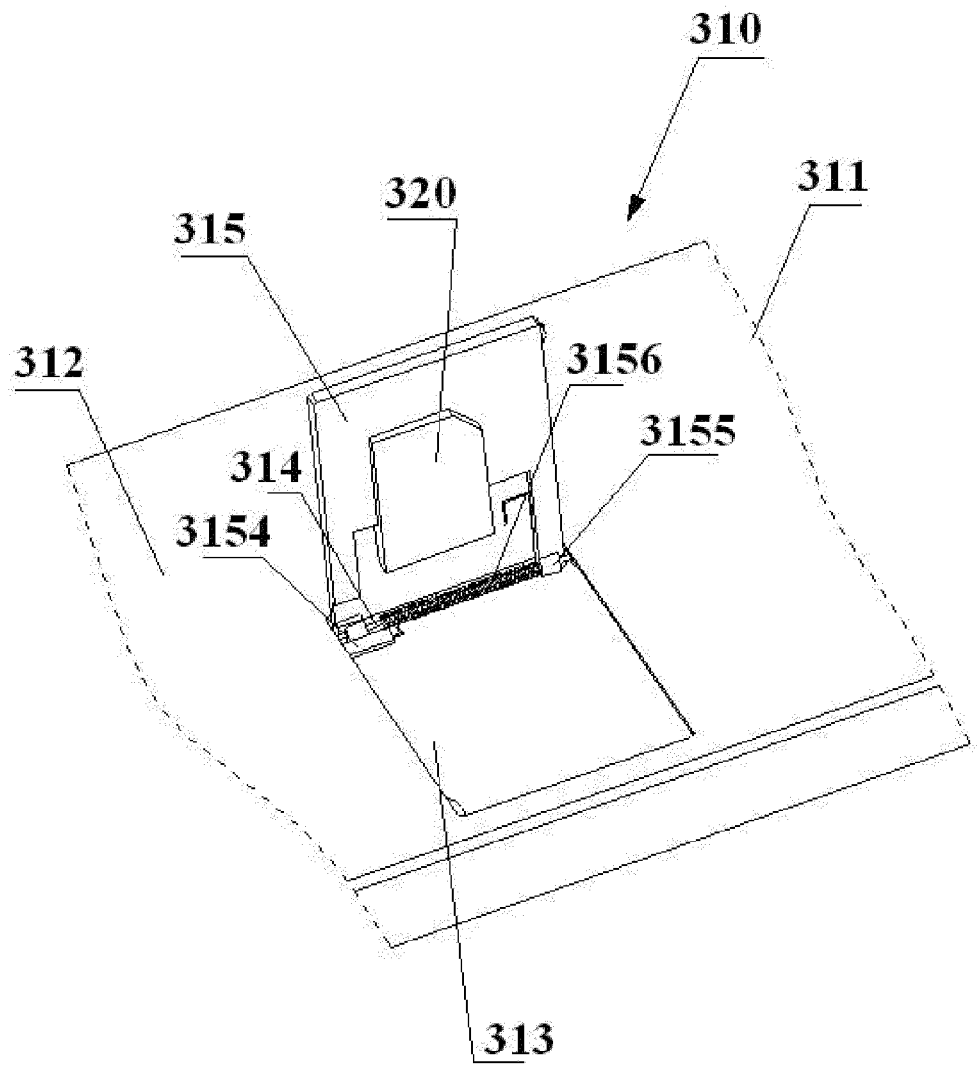
FIG. 11 is a schematic diagram for showing a auxiliary card fixing structure in an information processing device of a fifth embodiment of the invention.

Further, the invention further provides an information processing device of the fifth embodiment, and FIG. 11 is a schematic diagram for showing said auxiliary card fixing structure in the information processing device of the fifth embodiment of the invention.

In the fifth embodiment, the information processing device has a cover body 315 with the same structure of the third embodiment and the fourth embodiment; and a car fixing structure and an elastic support structure for closing and rotating the cover body 315.

Different from the third embodiment and the fourth embodiment, as shown in FIG. 11, the auxiliary card fixing structure 320 of the fifth embodiment is arranged on the cover body 315, and on the cover body 315, at the arrangement position of the auxiliary card fixing structure 320, the contacts for electrically connecting the auxiliary card with the mainboard are arranged.

In particular, the auxiliary card fixing structure 320 can make the auxiliary card be placed and fixed in the inserted space in a tight match manner, the auxiliary card fixing structure 320 includes an inserted space corresponding to the auxiliary card, the contacts for electrically connecting to the auxiliary card are arranged in the inserted space, and the contacts extend downwards to cross the core shaft 314 to be electrically connected with the mainboard, for electrically connecting the auxiliary card arranged in the inserted space with the mainboard.

In addition, in the fifth embodiment, the auxiliary card fixing structure can be configured as the structure as shown in FIG. 8, that is, can be configured as a form capable of being rotated and open, for exposing the inserted space. Wherein, the auxiliary card fixing structure 320 includes a bottom base 322 and a rotatable cover 323, and the rotatable cover 323 can rotate with respect to a fixed shaft of the bottom base 322, covering the bottom base 322 or opening with respect to the bottom base 322. As shown in FIG. 8, contacts 324 for electrically connecting the auxiliary card with the mainboard are arranged on the upper surface of the bottom base 322. In addition, connection terminals 325 extending downwards for electrically connecting to the mainboard are also included on the bottom base 322, and inside the bottom base 322, the connection terminals 325 contact with the contacts 324, to electrically connect the auxiliary card arranged on the bottom base 322 with the mainboard.

When the rotatable cover 323 covers the bottom base 322, an inserted space will be left between the rotatable cover 323 and the bottom base 322, for placing the auxiliary card, and the auxiliary card is clamped and fixed with the bottom base 322 through the rotatable cover 323, and is fixed in the inserted space.

With the arrangement structure of the fifth embodiment, since the auxiliary card fixing structure 320 and the contacts for electrically connecting the auxiliary card with the mainboard are arranged on the cover body 315, no matter whether the cover body 315 is in a state for covering the hole 313 or a state for being open, as long as the auxiliary card is arranged on the auxiliary card fixing structure 320, the functions of the auxiliary card can be realized through the information processing device. Thus, when using the fifth embodiment, when the first side face 312 of the cover body 315 is arranged as the bottom of the information processing device, while the cover body 315 opens outwards with respect to the hole 313, the cover body 315 can be not only used to install the auxiliary card, but also used to support the information processing device, for changing the height of the information processing device.

The information processing devices of the third embodiment through the fifth embodiment of the invention have the following effects:

The auxiliary card fixing structure for fixing the auxiliary card is arranged under the cover body and located in the internal space at the hole of the housing, when the cover body rotates with respect to the side face, the auxiliary card fixing structure can be sealed or exposed, so it is easy to install and detach the auxiliary card, the structure of the auxiliary card fixing structure arranged on the information processing device is simple, and it is convenient to manufacture and maintain it, for effectively saving the manufacture cost.

When the auxiliary card fixing structure and the contacts for electrically connecting the auxiliary card with the mainboard are all arranged on the cover body, the rotated and open cover body can be used to support the information processing device, making the information processing device have an adjustable height.

As above, the person skilled in the art can understand that the auxiliary card fixing structure for fixing the auxiliary card of the third embodiment through the fifth embodiment of the invention can be applied to the first housing of the information processing device for accommodating the calculating means, and can be applied to the second housing for accommodating the display means and the third housing for accommodating the input means and the power supply means. With the above description, the person skilled in the art can clearly understand how to apply the auxiliary card fixing structure for fixing the auxiliary card to the first housing, the second housing, and the third housing, which will not be described here. Also, the person skilled in the art can understand that the auxiliary card fixing structure for fixing auxiliary card can be simultaneously applied to a plurality of housings of the first housing, the second housing and the third housing, and it is not intended to limit the invention to these embodiments of the invention.

With the popularity of the electronic devices such as notebook computers, light weight, thinning, and portability are the most important development trends; the electronic devices with light and thin design have smaller size and less weight. Meanwhile, the requirement of the consumers for the product performance will be higher and higher, so how to achieve the product's function and performance while achieving the thin design is a big technical problem in the electronic device's development.

Taking a sound box as an example, the sound box is a very important component of the sound system of most electronic devices, function of the sound box is to transform an electrical signal into a sound signal to radiate it to the space for people to hear, so the performance of the sound box plays a key role in the sound quality of the sound system.

From the structural components, normally, the sound box includes a speaker and a resonant chamber, and the speaker (called as a trumpet) is a sound source, and the sound wave it emits is enhanced under the resonance effect of the resonant chamber, so the resonant chamber is called as the resonance chamber.

The size of the sound box needs to be considered according to factors such as type, size, volume, frequency of the resonance and so on, and be calculated by computer-assisted design and test. Its size directly affects the sound quality, and increasing the relative size of the chamber is an important direction for increasing the sound quality.

In the notebook computer, the space of the resonant chamber and the sound effect are a pair of conflict factors. On one hand, good sound effect needs a resonant chamber with a certain size, while on the other hand, with the less thickness of the notebook computer, because of the limitation of the size of the notebook computer, the space provided by the resonant chamber will be smaller, which causes the built-in sound box of the notebook computer cannot provide an sound effect output with large power, and most of them are regarded as trumpet for making sound, which cannot get satisfying effect in the quality and the tone aspects, and may even cause affricate when the sound volume is turned to a certain level.

Obviously, such sound effect cannot satisfy the user's requirements, so in the case that the sound effect of the built-in sound box is limited, some users can only use a earphone to replace the sound box, which significantly affects the multimedia function of the notebook computer.

One of the most important factors influencing the sound effect of the notebook computer is that the resonant boxes of the most notebook computers all use a closed structure.

Figure 12:
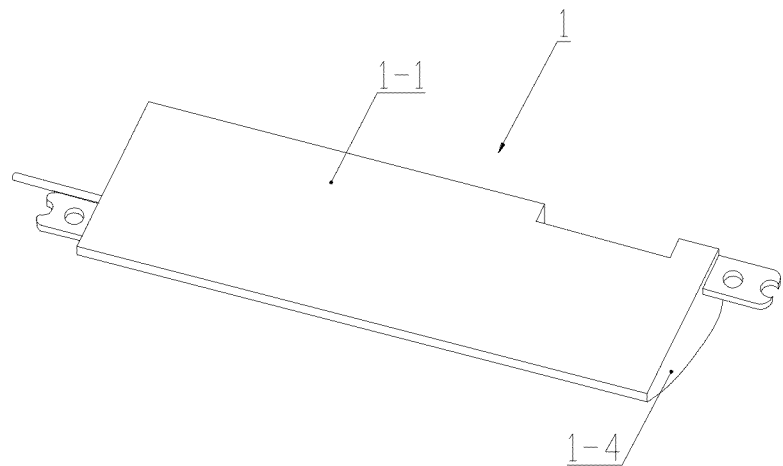
FIG. 12 is a structural schematic diagram of a resonance chamber of an existing notebook computer.
Figure 13:
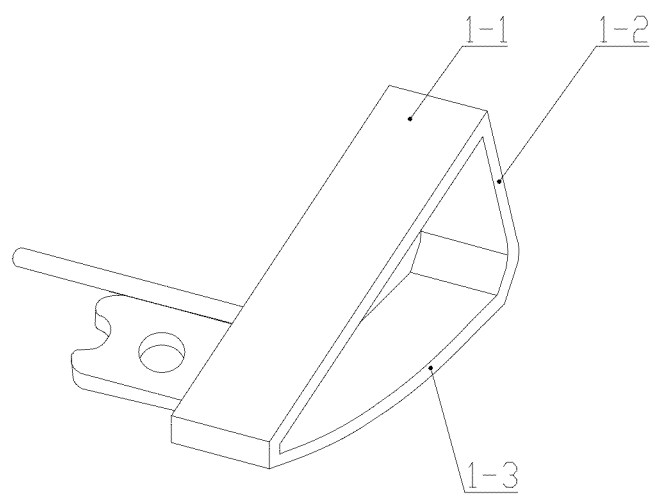
FIG. 13 is a sectional schematic diagram of the resonance chamber as shown in FIG. 12.

With reference to FIG. 12 and FIG. 13, FIG. 12 is a schematic diagram of the structure of the resonant box of the notebook computer; while FIG. 13 is a sectional schematic diagram of the resonant box as shown in FIG. 12.

As shown in drawings, the resonant box 1 shows a triangle with one side as an arc on the sectional face, and thus, a closed chamber is enclosed commonly by a bottom plate 1-1, a side plate 1-2, an arc plate 1-3 and an end plate 1-4, which are shaped as a whole. It is easy to know, in the case of limited space, the thinner size of the resonant box is, the larger the space occupied by the chamber wall is, which causes the sound effect of the sound box to be degraded in the same space condition. So, although the space occupied by the chamber wall can be reduced by reducing the thickness of the chamber wall, when the thickness of the chamber wall is reduced to a certain degree, it cannot be reduced any more, that is, it is very hard to improve the sound effect by merely reducing the thickness of the chamber wall.

Similarly, this defect also exists in the sound system of the mobile phone. Since the size of the mobile phone is smaller, the thickness is less, and the design requirement of the sound box is much stricter, the sound box of the above closed structure will cause it hard to realize a satisfying degree for the sound effect of the mobile phone.

Of course, not only sound boxes, but also other modules (such as heat dissipation modules) in many components of the portable mobile terminal can hardly solve the conflict between the size and the function, so in most cases, only the advantage of one aspect can be maintained, and on the contrary, the disadvantage of the other aspect exists.

Thus, the object of the embodiment of the invention further provides an information processing device. In the components of the information processing device, at least one module omits a part of structure at the mounting side overlapped with the housing and directly connects to the housing, and a corresponding part of the housing is used to replace the omitted part of structure to form a whole module, so that on the premise that the function is ensured, the thickness of the module can be compressed as much as possible, to make the information processing device lighter and thinner.

In order to realize the above objects, in the above information processing device, said first housing includes a plurality of functional modules located within said housing;

at least one said functional module is composed of at least two parts; wherein a first part of said at least two parts is a part of said first housing.

In the above information processing device,
said at least one said functional module is a built-in sound box.

In the above information processing device,
a second part of said built-in sound box is a box having a semi-open chamber, to form a sealed space with said part of said first housing, and said sealed space is a resonance chamber of said built-in sound box.

In the above information processing device,
a sealed layer is arranged between said box and the part of said first housing.

In the above information processing device,
at two ends of said box, support lugs extending outwards are arranged, and said support lug is arranged with a connection hole and is connected with the part of said first housing through screws.

In the above information processing device, said at least one said functional modules is embodied as a heat dissipator module.

In the above information processing device, a second part of said heat dissipator module is a fan component, and a mounting substrate of said fan component is the part of said first housing.

In addition to the first housing for accommodating the calculating means in the information processing device according to the embodiment of the invention, based on the first housing, the second housing or the third housing where the applied particular functional modules are located, the structure which omits a part of the functional module overlapped with the housing and directly connects to the housing can be similarly applied to the second housing for accommodating the display means and the third housing for accommodating the input means and the power supply means.

In the above the information processing device, said second housing includes a plurality of functional modules located within said housing; at least one said functional module is composed of at least two parts; wherein, the first part of said at least two parts is a part of said second housing.

In the above information processing device, said third housing includes a plurality of functional modules located within said housing; at least one said functional module is composed of at least two parts; wherein, the first part of said at least two parts is a part of said third housing.

The above information processing devices are further improvements based on the prior art, and based on the feature of partial functional modules which can be combined with the housing if necessary during the designing, the structure of the functional modules is adjusted to omit a part of the structure overlapped with the housing and directly connect to the housing, and the corresponding part of the housing is used to replace the omitted the part of the structure to form a whole module, so that on the premise that the function is ensured, the thickness of the module can be compressed as much as possible, to make the information processing device lighter and thinner.

In a particular embodiment, said at least one said functional module is a built-in sound box. The box of the built-in sound box is not a closed structure, but a semi-open structure, its mounting side has an opening, and the box opens outwards through the opening, which is equivalent to omitting the box plate at the mounting side of a traditional resonant box, when the box is mounted, the box is connected with the housing of the notebook computer through the opening, the housing of the notebook computer covers the opening, and forms a resonance chamber together with the housing part, and the space occupied by the box plate at the mounting side of the resonant box will be given to the resonance chamber. Limited by the size of the notebook computer, the thickness of the resonant chamber is normally very low, and the space occupied by the thickness of the chamber wall is relative large, and after using the above structure, on the premise that the thickness of the resonant box is the same, the space of the resonance chamber can be significantly increased, so as to obtain much greater sound effect.

The person skilled in the art can understand that although the above description is provided with reference to the case in which the structure of a part of the functional module overlapped with the housing is omitted in the information processing device and the functional module directly connected with the housing in the information processing device with three housings according to the embodiment of the invention, the structure of the part of the functional module overlapped with the housing is omitted and the functional module is directly connected with the housing according to the embodiment of the invention can be used independently, in any information processing device with at least one functional module in the housing.

Below, with reference to the sixth embodiment of the invention, a description will be made with reference to FIG. 14-18, wherein the structure of a part of the functional module overlapped with the housing being omitted and being directly connected with the housing according to the embodiment of the invention is used in any information processing device with at least one functional module in the housing.

First, the meaning of the reference numbers in FIG. 12-FIG. 18 will be explained briefly:

In FIG. 12 and FIG. 13:
1. resonant chamber, 1-1. bottom plate, 1-2. side plate, 1-3. arc plate, 1-4. end plate.

In FIG. 14 to FIG. 18:
10. chamber, 10-1. top plate, 10-2. side plate, 10-3. end plate, 10-4. support lug, 10-4-1. through hole, 20. bottom housing of notebook computer, 20-1. screw thread hole, 30. foam layer, 40. crew, 50. built-in sound box, 60. input device, 60-1. keyboard, 60-2. meshy sound hole.

The key of the sixth embodiment of the invention is to provide an information processing device. In the components of the information processing device, at least one module omits a part of the structure at the mounting side overlapped with the housing and directly connects to the housing, and a corresponding part of the housing is used to replace the omitted part of structure to form a whole module, so that on the premise that the function is ensured, the thickness of the module can be compressed as much as possible, to make the information processing device lighter and thinner.

The terms for indicating "up, down, left, right" directions and so on in the following description are based on the position relationship in the drawings, and merely for description.

According to the embodiment of the invention, an information processing device is provided, comprising:
a housing;
and respective functional modules located within said housing;
at least one said functional module is composed of at least two parts; wherein a first part of said at least two parts is a part of said housing.

Figure 14:
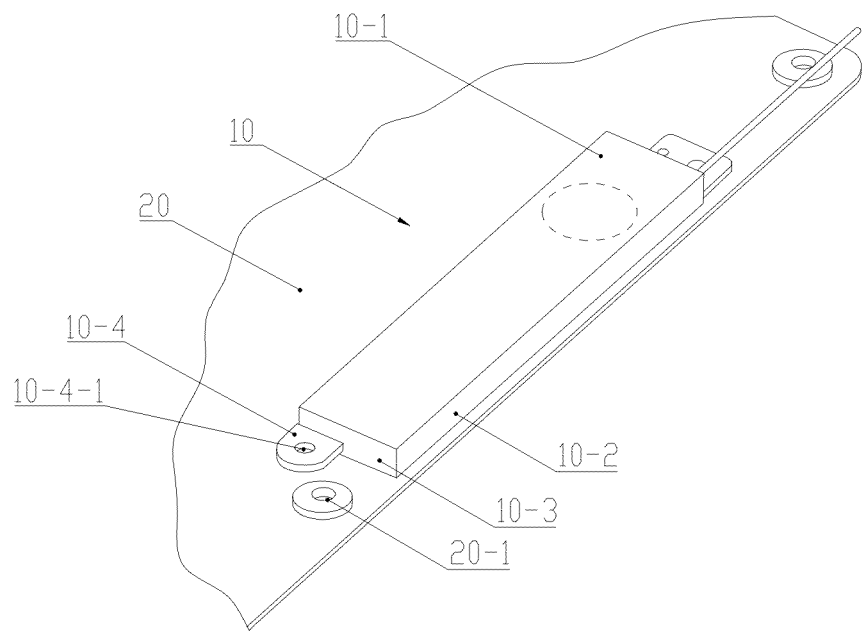
FIG. 14 is a schematic diagram of the relative position of a built-in sound box relative to a notebook computer housing in an information processing device of a sixth embodiment of the invention.
Figure 15:
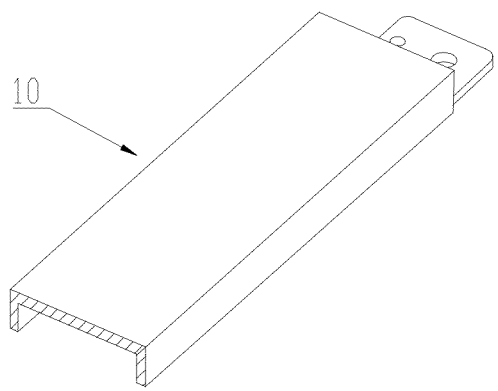
FIG. 15 is a sectional diagram of the built-in loudspeaker box as shown in FIG. 14.

With reference to FIG. 14 and FIG. 15, FIG. 14 is a schematic diagram of the relative position of a built-in sound box relative to a notebook computer housing in an information processing device of a sixth embodiment of the invention; FIG. 15 is a sectional diagram of the built-in sound box as shown in FIG. 14.

As shown in the drawings, in the sixth embodiment, the information processing device provided by the embodiment of the invention is a common open-close type notebook computer. In particular, it is mainly composed of three main parts of an input device, a display device, and a host system. An input device 60 is shown in the drawings, a built-in sound box 50 is mounted within the input device 60, two (left and right) built-in sound boxes 50 are arranged on the two sides of the keyboard 60-1, at an operating board of the input device 60, meshy sound holes 60-2 opposite to the built-in sound box 50 are arranged. The structure of other parts of the notebook computer is similar to the prior art, which will not be described here.

The box 10 of the built-in sound box 50 generally has a flat, rectangular shape. A box-shaped structure with an opening on the bottom is enclosed commonly by a top plate 10-1, a side plate 10-2, an end plate 10-3 which are shaped as a whole, its internal chamber opens outwards through the opening on the bottom, and a loudspeaker can be mounted at the position as shown by the dotted circle on the top plate 10-1. As seen, the loudspeaker is not mounted in the very middle of the top plate 10-1 of the box, but shifted towards one end by a certain distance.

Support lugs 10-4 extending outwards are arranged at two ends of the box 10, through holes 10-4-1 are arranged at the respective support lugs 10-4, and corresponding screw thread holes 20-1 are arranged on the internal surface of the bottom housing 20 of the notebook computer, so as to fix the box 10 on the bottom housing 20 of the notebook computer by crews.

Of course, the box 10 can be connected with the bottom housing 20 of the notebook computer by other methods. The other methods are for example, card-connecting structure and so on, and since the methods are so many that these methods will not be explained one by one here.

In the whole structure, the box 10 is a groove shape with an opening downwards, when being mounted, the box 10 covers the bottom housing 20 of the notebook computer with the opening downwards, its end faces around the opening are tightly attached to the internal surface of the bottom housing 20 of the notebook computer, and form a resonance chamber with the corresponding area of the bottom housing 20 of the notebook computer.

Figure 16:
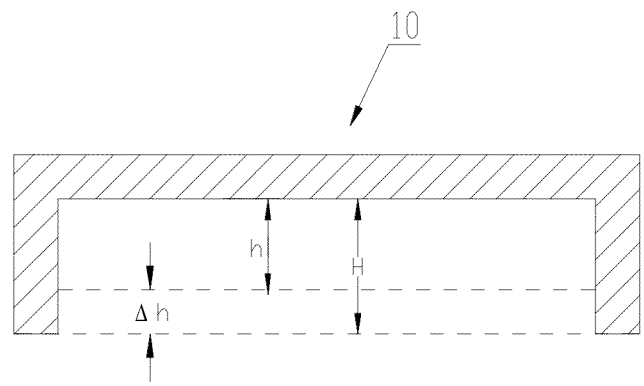
FIG. 16 is a sectional diagram of the built-in loudspeaker box as shown in FIG. 14.

With reference to FIG. 16, FIG. 16 is a sectional diagram of the built-in sound box as shown in FIG. 14;

The above box 10 is not a self-closed structure, but a semi-open structure, its mounting side has an opening, which equivalent to omitting the box plate at the mounting side of the traditional resonant box, and the space occupied by the box plate at the mounting side of the resonant box will be given to the resonance chamber.

The height of the chamber of the box 10 before the improvement is h, the thickness of the box plate at the mounting side is $\Delta h$, and the height of the chamber of the box 10 after the improvement is $H=h+\Delta h$. Limited by the size of the notebook computer, the height h of the chamber of the box 10 is normally very small, and the space occupied by the thickness $\Delta h$ of the box plate at the mounting is relatively large. In the above embodiments, $\Delta h$ is about 45% of h, and with the above structure, in the case that the height of the box 10 is the same, its effective resonance space may be increased by 45%, so as to significantly improve the sound effect, to enhance the multimedia performance of the notebook computer.

The reason for which the box 10 is designed as a flat, rectangular shape has two aspects, one of which is to use its regular shape to reduce the sound resistance, so as to further improve the sound quality; the other one of which is to tightly attach its regular shape with the bottom housing 20 of the notebook computer, so as to easily design, assemble and utilize the internal space of the bottom housing 20 of the notebook computer.

The person skilled in the art can understand that the box is a component arranged within the notebook computer, and limited by the internal space and layout restriction of the notebook computer, so its shape is not limited to the flat, rectangular shape, but can be changed according to different internal designs of the notebook computer. However, no matter how the shape of the box is changed, any built-in sound box with an open opening and forming a resonance chamber with the housing of the notebook computer is within the protection scope of the invention.

For the structure of the sound box, when the resonance chamber comprised of the box 10 and the bottom housing 20 of the notebook computer is completely closed, the air in the chamber is isolated from the outside to form a closed sound box; when sound holes are arranged on the box 10 to connect the air in the chamber with the outside, to form an open sound box.

The two types of the sound boxes have respective advantages, and can be selected according to the design. However, no matter which structure type of the box is used, it has relatively high requirements on the sealing performance at the joint of the box 10 to ensure that the box 10 can normally take part in resonance.

Figure 17:
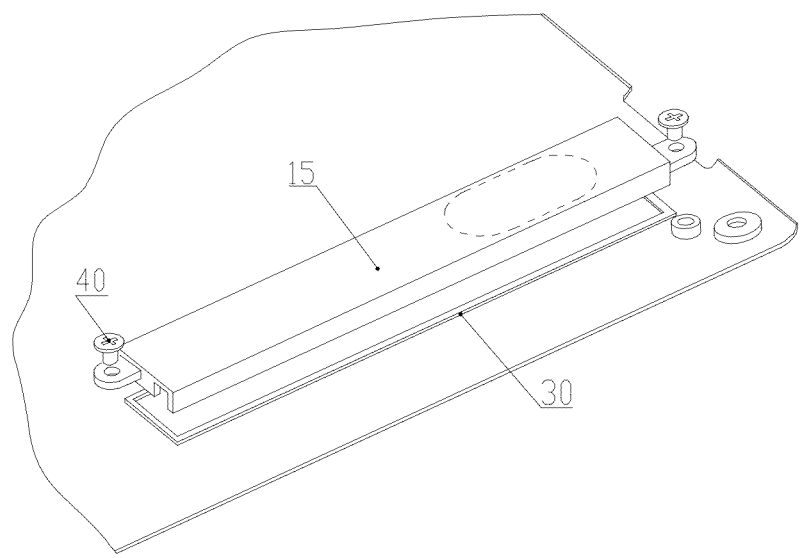
FIG. 17 is a broken-up structural schematic diagram of the connection between the built-in loudspeaker box and the notebook computer housing as shown in FIG. 14.
Figure 18:
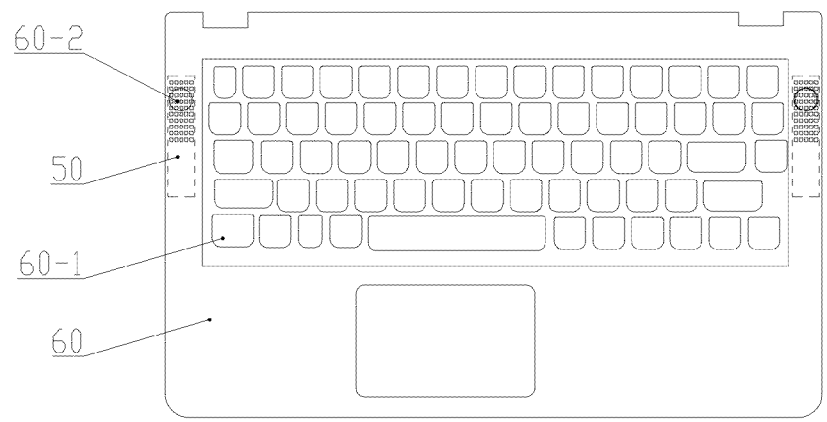
FIG. 18 is a layout diagram of the built-in loudspeaker box on the notebook computer as shown in FIG. 14.

With respect to FIG. 17, FIG. 17 is a schematic diagram for showing the break down structure provided by an embodiment of the invention for connecting the built-in sound box with the housing of the notebook computer.

In order to improve the sealing performance of the part for connecting the box 10 with the bottom housing 20 of the notebook computer, a sealing layer can be arranged between the open end face of the box 10 and the bottom housing 20 of the notebook computer. Here, a foam is used, and a foam layer 30 has a frame shape with the length and the width in consistent with the size of the box 10, which is set between the box 10 and the bottom housing 20 of the notebook computer, and the crews 40 at the two ends of the box 10 are tightly fixed when being assembled. Of course, in addition to the foam, a sealing gel or other materials can be used to perform sealing.

In addition to the built-in box, said functional module can further be electrical heat dissipator module, in the prior structure, the fan of the heat dissipator module is first arranged on a support board, then the support board is fixed on the housing of the notebook computer, after the improvement, the original support board structure is omitted, the fan of the heat dissipater module is directly mounted on the internal wall of the housing of the notebook computer through its rotatable shaft, and the housing of the notebook computer is used as a mounting substrate of the heat dissipater module, so that the whole thickness of the notebook computer can be significantly reduced.

Obviously, the information processing device is not limited to the notebook computer, but the sound system of the mobile phone can also use the above structure to lay the built-in sound box, and compared to the notebook computer, in addition to different body, structural components, the design concept of the built-in sound box is generally same, which uses the housing and the box to form a resonance chamber, and the details can be similar to the above detailed description, which will not be described again for the sake of simplicity.

As above, the person skilled in the art can understand that the structure for omitting a part of the functional module overlapped with the housing and directly connected with the housing according to the sixth embodiment of the invention can be applied to the first housing for accommodating the calculating means of the information processing device, and can also be applied to the second housing for accommodating the display means and the third housing for accommodating the input means and the power supply means. This is decided by which housing said functional module is located in, for example, the sound box module is generally located in the third housing, while the heat dissipater module is generally located in the first housing. However, the person skilled in the art may understand that the embodiments of the invention are not intended to limit such position relationship, for example, the sound box can be located in any housing, and the heat dissipater module can be located in any module. With the above description, the person skilled in the art can clearly understand how to apply the structure of omitting a part of the functional module overlapped with the housing and directly connected with the housing to the first housing, the second housing and the third housing, which will not be described again. Also, the person skilled in the art can understand that the structure for omitting a part of the functional module overlapped with the housing and directly connected with the housing can be simultaneously applied to a plurality of housings in the first housing, the second housing and the third housing, and the embodiments of the invention are not intended to limit this.

According to the development trend of the current notebook computer, the notebook computer continuously develops toward thin and light products with entertainment functions. As an entertainment device, the notebook computer normally needs to do the work for playing audios. The work for playing audios is normally completed by the speaker in the notebook computer. However, the playing effect of the existing speaker is proportional to the space occupied by the speaker. This conflicts with thin and light notebook computers. In order to maintain the relative small size of the notebook computer, some notebook computers select trumpets with very small size. However, this will cause the sound of the speaker to be too low to satisfy users. Thus, according to the existing design of the speaker, it is hard to ensure thin and light notebook computers while ensuring the display effect of the speakers.

Thus, the object of the embodiment of the invention is to provide a new speaker structure in an information processing device.

In said information processing device, the third housing has a speaker structure, comprising:

a metal support board, having a plurality of through holes;

a thin film, fixed on the surface of said metal support board, partially covering said plurality of holes or completely covering said plurality of holes.

Wherein, said metal support board has a first contact, and said first contact is used to connect to a power supply line end or a signal line end of a sound source line, said thin film has a second contact, and said second contact is used to connect to a signal line end or a power supply line end of a sound source line.

In the above information processing device, said metal support board is composed of a metal support board of said input means of said information processing device.

In the above information processing device, said thin film is composed of a composite material including conductive material and insulative material.

In the above information processing device, a plurality of dot-shaped regions with a fixed interval on said thin film are adhered to the surface of said metal support board.

The above information processing device further comprises, a keycap;

a circuit board;

a metal support board for supporting said keycap and said circuit board, having a plurality of through holes;

a thin film, fixed on the surface of said metal support board in a manner of not mutually interfering with said keycap and said circuit board, partially covering said plurality of through holes or completely covering said plurality of rectangular holes.

In the above information processing device, said thin film is composed of a composite material including conductive material and insulative material.

In the above information processing device, the thickness of said thin film is 0.25 mm.

In the above information processing device, a plurality of dot-shaped regions with a fixed interval on said thin film are adhered to the surface of said metal support board.

In the above information processing device, a sound signal of the sound source element of said information processing device is input to said support board or said thin film through leads;

a power supply signal of the sound source element of said information processing device is input to said support board or said thin film through leads.

In the above speaker structure, the metal support board and the thin film vibration generating means are combined to form a new device with both functions of a keyboard and a speaker. Since this thin film vibration generating means is very light and thin, after combined with the input means of the information processing device, the thickness amount of the whole machine will not be influenced. Also, the through hole design of the metal support board makes the sound easy to be transmitted into the ears of the user, and the sound effect is significant.

The person skilled in the art can understand that while the above description is performed with reference to the case that the speaker structure according the embodiment of the invention is used in the information processing device with three housings, the speaker structure according the embodiment of the invention can be used individually, to be used in any information processing device with at least one functional module in the housing.

Below, a description will be made with reference to a seventh embodiment through a ninth embodiment of the invention, according to FIG. 19, which shows the case that the speaker according to the embodiment of the invention is used in any information processing device with an input means.

According to an embodiment of the invention, a speaker structure of an information processing device is provided, comprising:

a metal support board, having a plurality of through holes;

a thin film, fixed on the surface of said metal support board, partially covering said plurality of through holes or completely covering said plurality of through holes.

Wherein, said metal support board has a first contact, and said first contact is used to connect to a power supply line end or a signal line end of a sound source line, said thin film has a second contact, and said second contact is used to connect to a signal line end or a power supply line end of a sound source line.

According to an embodiment of the invention, an information processing device is provided, comprising:

a keycap;

a circuit board;

a metal support board for supporting said keycap and said circuit board, having a plurality of through holes;

a thin film, fixed on the surface of said metal support board in a manner of not mutually interfering with said keycap and said circuit board, partially covering said plurality of through holes or completely covering said plurality of through holes.

Figure 19:
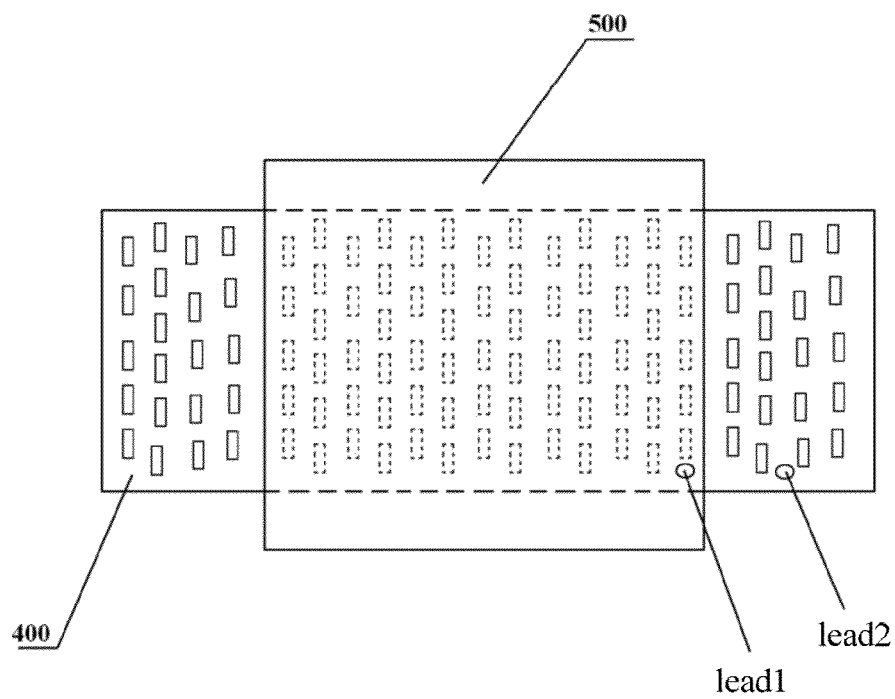
FIG. 19 shows a stereo diagram of a loudspeaker structure according to a seventh embodiment of the invention.

As shown in FIG. 19, the speaker according to the seventh embodiment of the invention comprises: a metal support board 400 having a plurality of holes; a thin firm 500 fixed on the surface of said metal support board 400 and partially covering said plurality of through holes or completely covering said plurality of through holes. The metal support board 400 has a first contact, and said first contact is used to connect to a power supply line end or a signal line end of a sound source line. The thin film 500 has a second contact, and said second contact is used to connect to a signal line end or a power supply line end of a sound source line.

In the speaker according to the seventh embodiment of the invention, the thin film 500 as a vibration means is composed of a composite material including conductive material and insulative material. The thin firm has conductivity and flexibility. Its thickness can be 0.25 mm. Also, the thin film can be fixed on the surface of the metal support board in a dot-fixed manner with several methods; for example, by adhering dot-shaped regions with a fixed interval on the thin film to the surface of the metal support board.

The eighth embodiment of the invention provides an information processing device, comprising: a keycap; a circuit board; a metal support means for supporting said keycap and said circuit board having a plurality of through holes; and a thin film. The thin film is fixed on the surface of said metal support board in a manner of not mutually interfering with said keycap and said circuit board and partially covering said plurality of through holes or completely covering said plurality of through holes. The input means of the existing information processing device, such as a keyboard is normally constructed with a metal support board 400 on the bottom. And said metal support board 400 has a plurality of holes. In the information processing device according to the eighth embodiment of the invention, the metal support means is a metal support board 400, and a thin film 500 is fixed on the part of the surface of the metal support board 400 with said plurality of through holes. Of course, the plurality of holes on the metal support board 400 can be arranged all over the metal support board 400. At this point, the thin film 500 is fixed on the metal support board 400, covering the part of said plurality of through holes; and of course, it can be understood that in order to improve the sound effect, when the size of the thin film 500 is consistent with the size of the metal support board 400, the thin film 500 covers all the plurality of through holes. Two leads (pins) of the sound source line of the portable computer are connected to the metal support board 400 and the thin film 500, respectively. When the speaker operates, a sound signal from the sound source element, such as sound card, of the portable computer is input to the metal support board 400 and the thin film 500 respectively through leads. Since an audio electricity flows between the metal support board 400 and the thin film 500, there will be magnetic field between them, so the thin film 500 fixed on the surface of the metal support board 400 will vibrate so as to generate sound. Also, the sound generated by the vibration can be successful transmitted outside the portable computer through the holes arranged on the metal support board 400.

In addition to a metal support board 400, a keyboard of the existing information processing device is normally configured with a plurality of keycaps and a circuit board, and in order to not affect normal use of the keyboard and ensure the sound effect generated by the cooperation between the thin film 500 and the metal support board 400, in the ninth embodiment of the invention, the thin film 500 is fixed on the surface of the metal support board 400, and located at a position without interfering with other components of the keyboard means of the information processing device. For example, the keys and the circuit board of the keyboard are located above the upper surface of the metal support board 400, and the thin film 500 is fixed on the lower surface of the metal support board 400, or, located on the upper surface of the metal support board 400, at a position without interfering with the circuit.

The information processing device may be notebook computer, cell phone, PDA, flat computer, electronic book, electronic dictionary and so on.

The person skilled in the art can understand that in the information processing device with three housings, the input means such as keyboard is normally arranged in the third housing, so since the speaker structure according to the embodiment of the invention uses the combination of the metal support board and the thin film vibration generating means to form a new device with both functions of the keyboard and the speaker, the speaker structure is also arranged in the third housing. However, if the input means such as keyboard is arranged in the first housing or the second housing, the speaker structure according to the embodiment of the invention is correspondingly arranged in the first housing or the second housing, but the embodiments of the invention are not intended to limit this.

In addition, the person skilled in the art can understand that the above description is provided regarding to the auxiliary card fixing structure for fixing the auxiliary card according to the third through fifth embodiments, the structure for omitting a part of the functional module overlapped with the housing and directly connecting to the housing according to the sixth embodiment and the case that the speaker structure is applied to the information processing device with three housings respectively according to the seventh through ninth embodiments, but the auxiliary card fixing structure for fixing the auxiliary card according to the third through fifth embodiments, the structure for omitting a part of the functional module overlapped with the housing and directly connecting to the housing according to the sixth embodiment and the speaker structure according to the seventh through ninth embodiments can be combined mutually. For example, when the structure for omitting a part of the functional module overlapped with the housing and directly connecting to the housing according to the embodiment and the speaker structure according to the seventh through ninth embodiments are combined, on the one hand, the speaker structure of the sound means is arranged in a form of covering the thin film of the metal support board with a plurality of through holes, and on the other hand, a part of the sound box module overlapped with the housing in the sound means can be omitted and directly connected to the housing. The person skilled in the art can easily understand how to combine the technical solutions of the several embodiments of the invention according to the description of the several embodiments, which will not be described here. And, the person skilled in the art can understand that any technical solution combining any of the several embodiments of the invention is within the protection scope of the invention.

As above, several embodiments of the intention are described in detail, but the invention is not limited to this. The person skilled in the art should understand that any modification, combination, sub-combination or alternation can be performed according to design requirements or other factors, and they are within the scope of the attached claims and their equivalent.

What is claimed is:
1. An information processing device, comprising:
a first housing for accommodating a calculating means;
a second housing for accommodating a display means;
a third housing for accommodating an input means and a power supply means;
a first connection means for connecting said first housing with said third housing; and
a second connection means for connecting said second housing with said third housing, wherein
the calculating means includes a mainboard;
the first housing includes a plurality of side faces that form an accommodating space of said first housing, the mainboard is arranged within the accommodating space, wherein, a hole is arranged on a first side face of the plurality of side faces;

the information processing device further includes:
an auxiliary card fixing structure, for fixing an auxiliary card and electrically connecting the auxiliary card to the mainboard;
a core shaft, fixedly arranged on one side of the hole;
a cover body connected to the first housing through the core shaft, the cover body rotating outside the accommodating space with respect to the core shaft, for exposing the hole to expose the auxiliary card fixing structure out, and for covering the hole to seal the auxiliary card fixing structure within the accommodating space.

2. The information processing device according to claim 1, wherein,
said first housing has a first space enclosed by at least six end faces,
said second housing has a second space enclosed by at least six end faces,
said third housing has a third space enclosed by at least six end faces, and
wherein, the front end face of said first housing is connected with the back end face of said third housing through said first connection means, and the back end face of said second housing is connected with the back end face of said third housing through said second connection means.

3. The information processing device according to claim 2, wherein, the first end face of the first connection means is connected with the front end face of the first housing in a plug-pull manner, and/or the second end of the first connection means is connected with the back end face of the third housing in a plug-pull manner.

4. The information processing device according to claim 2, wherein, said first connection means includes a rotary shaft, wherein, said first housing is rotatably connected with said third housing through said rotary shaft.

5. The information processing device according to claim 4, wherein, the angle between said first housing and said third housing is 0° to 180°.

6. The information processing device according to claim 5, said information device further comprising: a self-locking means, configured to fix the position of the first housing relative to the third housing.

7. The information processing device according to claim 6, wherein, when the self-locking means fixes the position of the first housing relative to the third housing, said angle between the first housing and the third housing is 135°.

8. The information processing device according to claim 1, wherein, said calculating means includes a mainboard component, a processor component, a heat dissipator component, a display output component, and a storage component.

9. The information processing device according to claim 1, wherein, said power supply supplies power to said calculating means and said display means.

10. The information processing device according to claim 1, wherein, the thickness of said first housing is less than or equal to a sum of the thicknesses of said second housing and the thickness of said third housing.

11. The information processing device according to claim 1, wherein, said auxiliary card fixing structure is arranged on said mainboard and located at said hole, and on said mainboard, contacts for electrically connecting said auxiliary card with said mainboard is arranged at the arrangement position of said auxiliary card fixing structure.

12. The information processing device according to claim 1, wherein, said auxiliary card fixing structure is arranged on said cover body, and on said mainboard, contacts for electrically connecting said auxiliary card with said mainboard is arranged at the corresponding position of said auxiliary card fixing structure when said cover body is arranged to cover said hole.

13. The information processing device according to claim 1, wherein, said information processing device further includes a card fixing structure for fixedly connecting said cover body with said first housing when said cover body is arranged to cover said hole.

14. The information processing device according to claim 13, wherein, said information processing device further includes an elastic support structure, connected with said first housing, said cover body and said core shaft, for providing said card fixing structure with a first elastic support force for tightening said cover body and said housing, and for providing said core shaft with a second elastic support force for rotating said cover body with respect to said housing.

15. The information processing device according to claim 14, wherein said card fixing structure includes:
a bump, formed on a side of said cover body;
a slot, arranged on a corresponding position of said bump when said cover body is arranged to cover said hole, said bump being inserted into said slot to stick and fix said cover body.

16. The information processing device according to claim 15, wherein said elastic support structure includes:
a first pushing body, fixedly connected with said first housing;
a second pushing body, fixedly connected with said cover body;
a spring, sleeving said core shaft, located between said first pushing body and said second pushing body, wherein, a first end of said spring extends to contact and connect to said cover body, a second end extends to contact and connect to said first housing, an elastic force of said spring pushing said second pushing body forms said first elastic support force, and a first pushing force of said first end pushing said cover body, a second pushing force of said second end pushing said first housing and an elastic twist force of said spring between said first end and said second end form said second elastic support force, for turning and opening said cover body with respect to said first housing.

17. The information processing device according to claim 1, wherein said first side face is a bottom face of said first housing, and said cover body opening outwards with respect to said hole is further used to support said information processing device.

18. The information processing device according to claim 1, wherein,
said display means includes a mainboard;
said second housing includes a plurality of side faces, said plurality of side faces form an accommodating space of said second housing, said mainboard is arranged within said accommodating space, wherein, a hole is arranged on a first side face of said plurality of side faces;
said information processing device further includes:
an auxiliary card fixing structure, for fixing an auxiliary card and electrically connecting said auxiliary card with said mainboard;
a core shaft, fixedly arranged on one side of said hole;
a cover body, connected with said second housing through said core shaft, said cover body rotating outside said accommodating space with respect to said core shaft, for exposing said hole to expose said auxiliary card fixing structure out, and for covering said hole to seal said auxiliary card fixing structure within said accommodating space.

19. The information processing device according to claim 1, wherein,
said input means and said power supply means include a mainboard;
said third housing includes a plurality of side faces, said plurality of side faces form an accommodating space of said third housing, said mainboard is arranged within said accommodating space, wherein a hole is arranged on a first side face of said plurality of side faces;
said information processing device further includes:
an auxiliary card fixing structure, for fixing an auxiliary card and electrically connecting said auxiliary card with said mainboard;
a core shaft, fixedly arranged on one side of said hole;
a cover body, connected with said second housing through said core shaft, said cover body rotating outside said accommodating space with respect to said core shaft, for exposing said hole to expose said auxiliary card fixing structure out, and for covering said hole to seal said auxiliary card fixing structure within said accommodating space.

20. The information processing device according to claim 1, wherein,
said first housing includes a plurality of functional modules located within said housing;
at least one said functional module is composed of at least two parts; wherein a first part of said at least two parts is a part of said first housing.

21. The information processing device according to claim 20, wherein,
said at least one said functional module is a built-in sound box; and,
a second part of said built-in sound box is a box having a semi-open chamber, to form a sealed space with said part of said first housing, and said sealed space is a resonance chamber of said built-in sound box.

22. The information processing device according to claim 21, wherein, a sealed layer is arranged between said box and the part of said first housing.

23. The information processing device according to claim 20, wherein, said at least one said functional modules is embodied as a heat dissipator module and a second part of said heat dissipator module is a fan component, and a mounting substrate of said fan component is the part of said first housing.

24. The information processing device according to claim 1, wherein,
said second housing includes a plurality of functional modules located within said housing;
at least one said functional module is composed of at least two parts; wherein a first part of said at least two parts is a part of said second housing.

25. The information processing device according to claim 1, wherein,
said third housing includes a plurality of functional modules located within said housing;
at least one said functional module is composed of at least two parts; wherein a first part of said at least two parts is a local part of said third housing.

26. The information processing device according to claim 1, wherein,
said third housing has a loudspeaker structure, including:
a metal support board, having a plurality of through holes;
a thin film, fixed on the surface of said metal support board, partially covering said plurality of through holes or completely covering said plurality of through holes,
wherein, said metal support board has a first contact, and said first contact is used to connect to a power supply line end or a signal line end of a sound source line, said thin film has a second contact, and said second contact is used to connect to a signal line end or a power supply line end of a sound source line.

27. The information processing device according to claim 26, wherein, said metal support board is composed of a metal support board of said input means of said information processing device.

28. The information processing device according to claim 1, further comprising:
a keycap;
a circuit board;
a metal support board for supporting said keycap and said circuit board, having a plurality of through holes;
a thin film, fixed on the surface of said metal support board in a manner of not mutually interfering with said keycap and said circuit board, partially covering said plurality of holes or completely covering said plurality of holes.

29. The information processing device according to claim 28, wherein,
a sound signal of the sound source element of said information processing device is input to said support board or said thin film through leads;
a power supply signal of the sound source element of said information processing device is input to said support board or said thin film through leads.

30. The information processing device of claim 1 further comprising a loudspeaker structure comprising:
a metal support board, having a plurality of holes;
a thin film, fixed on the surface of said metal support board, partially covering said plurality of holes or completely covering said plurality of holes,
wherein, said metal support board has a first contact, and said first contact is used to connect to a power supply line end or a signal line end of a sound source line, said thin film has a second contact, and said second contact is used to connect to a signal line end or a power supply line end of a sound source line.

31. The information processing device according to claim 1 further comprising:
a keycap;
a circuit board;
a metal support means for supporting said keycap and said circuit board, having a plurality of holes;
a thin film, fixed on the surface of said metal support board in a manner of not mutually interfering with said keycap and said circuit board, partially covering said plurality of holes or completely covering said plurality of holes.

32. An information processing device, comprising:
a first housing for accommodating a calculating means;
a second housing for accommodating a display means;
a third housing for accommodating an input means and a power supply means;
a first connection means for connecting said first housing with said third housing; and
a second connection means for connecting said first housing with said second housing, wherein
the calculating means includes a mainboard;
the first housing includes a plurality of side faces that form an accommodating space of said first housing, the mainboard is arranged within the accommodating space, wherein, a hole is arranged on a first side face of the plurality of side faces;

the information processing device further includes:
an auxiliary card fixing structure, for fixing an auxiliary card and electrically connecting the auxiliary card to the mainboard;
a core shaft, fixedly arranged on one side of the hole;
a cover body connected to the first housing through the core shaft, the cover body rotating outside the accommodating space with respect to the core shaft, for exposing the hole to expose the auxiliary card fixing structure out, and for covering the hole to seal the auxiliary card fixing structure within the accommodating space.

33. An information processing device, comprising:
a first housing for accommodating a calculating means;
a second housing for accommodating a display means;
a third housing for accommodating an input means and a power supply means;
a first connection means for connecting to said firs housing, said second housing and said third housing, respectively, wherein the calculating means includes a mainboard;
the first housing includes a plurality of side faces that form an accommodating space of said first housing, the mainboard is arranged within the accommodating space, wherein, a hole is arranged on a first side face of the plurality of side faces;
the information processing device further includes:
an auxiliary card fixing structure, for fixing an auxiliary card and electrically connecting the auxiliary card to the mainboard;
a core shaft, fixedly arranged on one side of the hole;
a cover body connected to the first housing through the core shaft, the cover body rotating outside the accommodating space with respect to the core shaft, for exposing the hole to expose the auxiliary card fixing structure out, and for covering the hole to seal the auxiliary card fixing structure within the accommodating space.

34. An information processing device, comprising:
a first housing for accommodating a calculating means;
a second housing for accommodating a display means;
a third housing for accommodating an input means, a power supply means and a built-in sound box;
the box of said built-in sound box has a semi-open chamber, said box and a part of said third housing form a sealed space, and said sealed space is a resonance chamber of said built-in sound box;
further, a first connection means is configured to connect said first housing with said third housing, and a second connection means is configured to connect said second housing with said third housing,
or, a first connection means is configured to connect said first housing with said third housing, and a second connection means is configured to connect said first housing with said second housing,
or, a first connection means is configured to connect to said firs housing, said second housing and said third housing, respectively;
wires, pins or flexible printed circuits are disposed in said first connection means, to electrically connect said calculating means in said first housing with said built-in sound box in said third housing, so as to enable said built-in sound box to receive an audio signal from said calculating means, wherein
the calculating means includes a mainboard;
the first housing includes a plurality of side faces that form an accommodating space of said first housing, the mainboard is arranged within the accommodating space, wherein, a hole is arranged on a first side face of the plurality of side faces;
the information processing device further includes:
an auxiliary card fixing structure, for fixing an auxiliary card and electrically connecting the auxiliary card to the mainboard;
a core shaft, fixedly arranged on one side of the hole;
a cover body connected to the first housing through the core shaft, the cover body rotating outside the accommodating space with respect to the core shaft, for exposing the hole to expose the auxiliary card fixing structure out, and for covering the hole to seal the auxiliary card fixing structure within the accommodating space.

* * * * *